United States Patent
Yagi et al.

(10) Patent No.: US 8,958,641 B2
(45) Date of Patent: Feb. 17, 2015

(54) MOVING OBJECT DETECTION DEVICE

(75) Inventors: Yasushi Yagi, Hyogo (JP); Yasushi Makihara, Osaka (JP); Chunsheng Hua, Osaka (JP)

(73) Assignee: Osaka University, Osaka (JP)

( * ) Notice: Subject to any disclaimer, the term of this patent is extended or adjusted under 35 U.S.C. 154(b) by 48 days.

(21) Appl. No.: 13/805,527

(22) PCT Filed: Jun. 20, 2011

(86) PCT No.: PCT/JP2011/003492
§ 371 (c)(1),
(2), (4) Date: Dec. 19, 2012

(87) PCT Pub. No.: WO2011/161924
PCT Pub. Date: Dec. 29, 2011

(65) Prior Publication Data
US 2013/0094759 A1    Apr. 18, 2013

(30) Foreign Application Priority Data

Jun. 23, 2010    (JP) .................................. 2010-143213

(51) Int. Cl.
*G06K 9/00* (2006.01)
*G06K 9/32* (2006.01)
(Continued)

(52) U.S. Cl.
CPC .......... *G06K 9/3241* (2013.01); *G06K 9/00369* (2013.01); *G06K 9/4647* (2013.01);
(Continued)

(58) Field of Classification Search
USPC ......... 382/107, 159, 170, 190, 224, 285, 168; 324/306, 309; 386/210, 278; 600/419
See application file for complete search history.

(56) References Cited

U.S. PATENT DOCUMENTS

| 7,146,022 B2 | 12/2006 | Masukura et al. ............. 382/103 |
| 7,330,569 B2 * | 2/2008 | Lin .............................. 382/107 |

(Continued)

FOREIGN PATENT DOCUMENTS

| CN | 1839409 A | 9/2006 | ................ G06T 7/20 |
| CN | 101482923 A | 7/2009 | ................ G06K 9/00 |

(Continued)

OTHER PUBLICATIONS

International Search Report issued Jul. 12, 2011 in International (PCT) Application No. PCT/JP2011/003492.

(Continued)

*Primary Examiner* — Anh Do
(74) *Attorney, Agent, or Firm* — Wenderoth, Lind & Ponack, L.L.P.

(57) ABSTRACT

A moving object detection device includes a window setting unit configured to set a window having a predetermined volume in a video, an orientation of spatial intensity gradient calculation unit configured to calculate, for each pixel included in the window, an orientation of spatial intensity gradient, a spatial histogram calculation unit configured to calculate a spatial histogram that is a histogram of the orientation of spatial intensity gradient within the window, an orientation of temporal intensity gradient calculation unit configured to calculate, for each pixel included in the window, an orientation of temporal intensity gradient, a temporal histogram calculation unit configured to calculate a temporal histogram that is a histogram of an orientation of temporal intensity gradient within the window, and a determination unit configured to determine whether or not the moving object is included within the window based on the spatial histogram and the temporal histogram.

13 Claims, 34 Drawing Sheets

(51) Int. Cl.
*G06K 9/46* (2006.01)
*G06T 7/20* (2006.01)

(52) U.S. Cl.
CPC ............ *G06T7/2006* (2013.01); *G06T 7/2066* (2013.01); *G06K 9/00771* (2013.01); *G06K 2009/3291* (2013.01); *G06T 2207/30196* (2013.01)
USPC ............ 382/170; 382/107; 382/168; 382/224

(56) References Cited

U.S. PATENT DOCUMENTS

| | | | | |
|---|---|---|---|---|
| 7,613,325 | B2 | 11/2009 | Iwasaki et al. | 382/103 |
| 7,899,253 | B2 * | 3/2011 | Porikli et al. | 382/190 |
| 2002/0181741 | A1 | 12/2002 | Masukura et al. | 382/103 |
| 2006/0078164 | A1 | 4/2006 | Lin | 382/107 |
| 2006/0115116 | A1 | 6/2006 | Iwasaki et al. | 382/103 |
| 2008/0063285 | A1 | 3/2008 | Porikli et al. | 428/35.2 |

FOREIGN PATENT DOCUMENTS

| | | | | |
|---|---|---|---|---|
| CN | 101521740 A | 9/2009 | | G06T 7/20 |
| JP | 2002-359777 | 12/2002 | | H04N 5/262 |
| WO | 2005/020152 | 3/2005 | | G06T 7/20 |

OTHER PUBLICATIONS

Navneet Dalal et al., "Histograms of Oriented Gradients for Human Detection", IEEE Computer Society Conference on Computer Vision and Pattern Recognition (CVPR 2005), vol. 1, Jun. 2005, p. 886-893.
Tomoki Watanabe et al., "Co-occurrence Histograms of Oriented Gradients for Pedestrian Detection", proceedings of the Third Pacific-Rim Symposium on Image and Video Technology (PSIVT2009), LNCS 5414, pp. 37-47, Jan. 2009.
Ivan Laptev et al., "Learning realistic human actions from movies", IEEE Conference on Computer Vision and Pattern Recognition (CVPR 2008), Jun. 2008.
Ivan Laptev et al., "Retrieving actions in movies", IEEE 11th International Conference on Computer Vision (ICCV 2007), Oct. 2007.
Alexander Kläser et al., "A Spatio-Temporal Descriptor Based on 3D-Gradients", British Machine Vision Conference (BMVC 2008), inria-00514853, Version 1 (Sep. 2010).
Shivani Agarwal et al., "Learning a Sparse Representation for Object Detection", Proceedings of the Seventh European Conference on Computer Vision (ECCV 2002), May 2002.
Chunsheng Hua et al., "Pedestrian Detection by Combining the Spatio and Temporal Features", Meeting on Image Recognition & Understanding (MIRU 2010), Jul. 2010, p. 1715-1722.

* cited by examiner

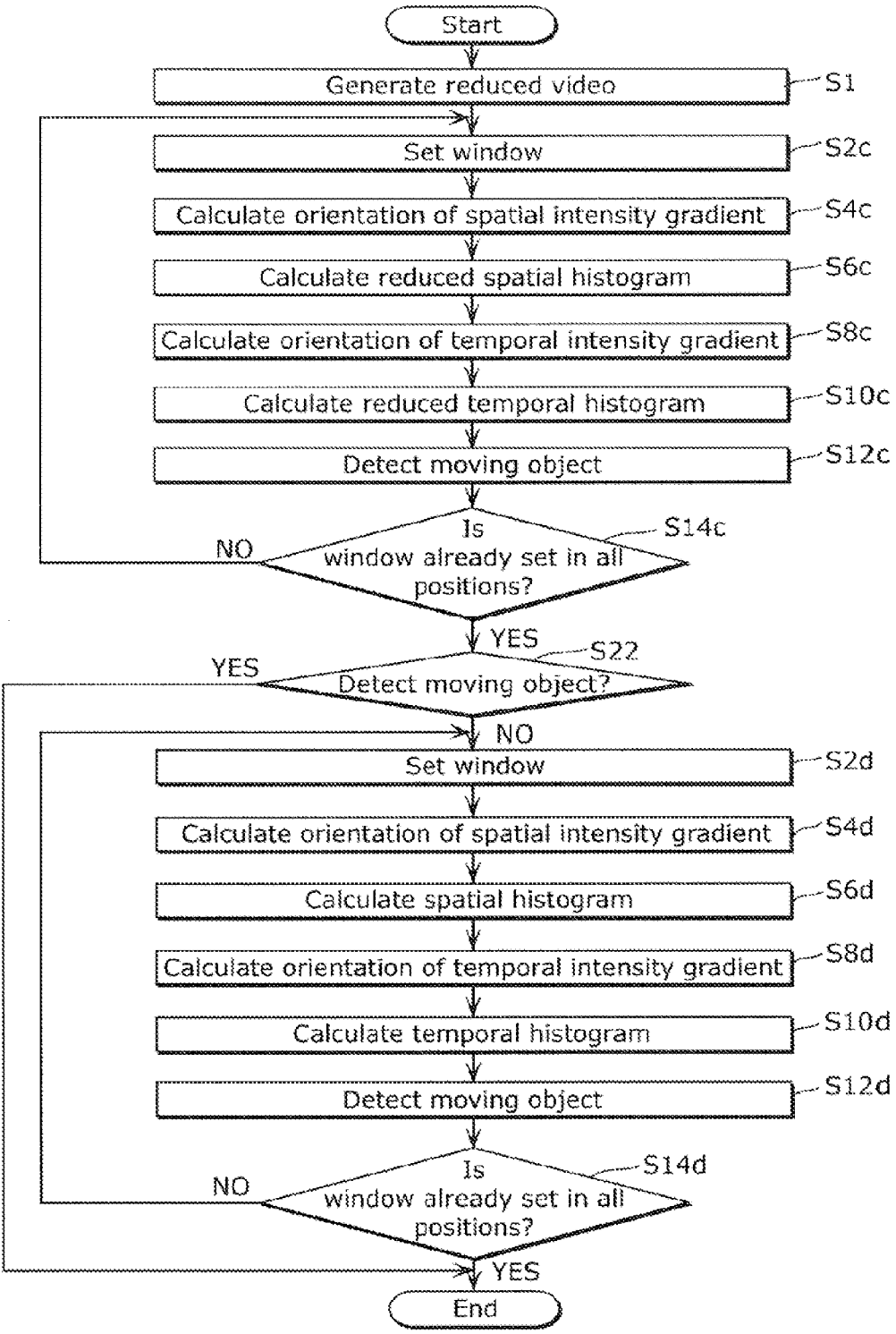

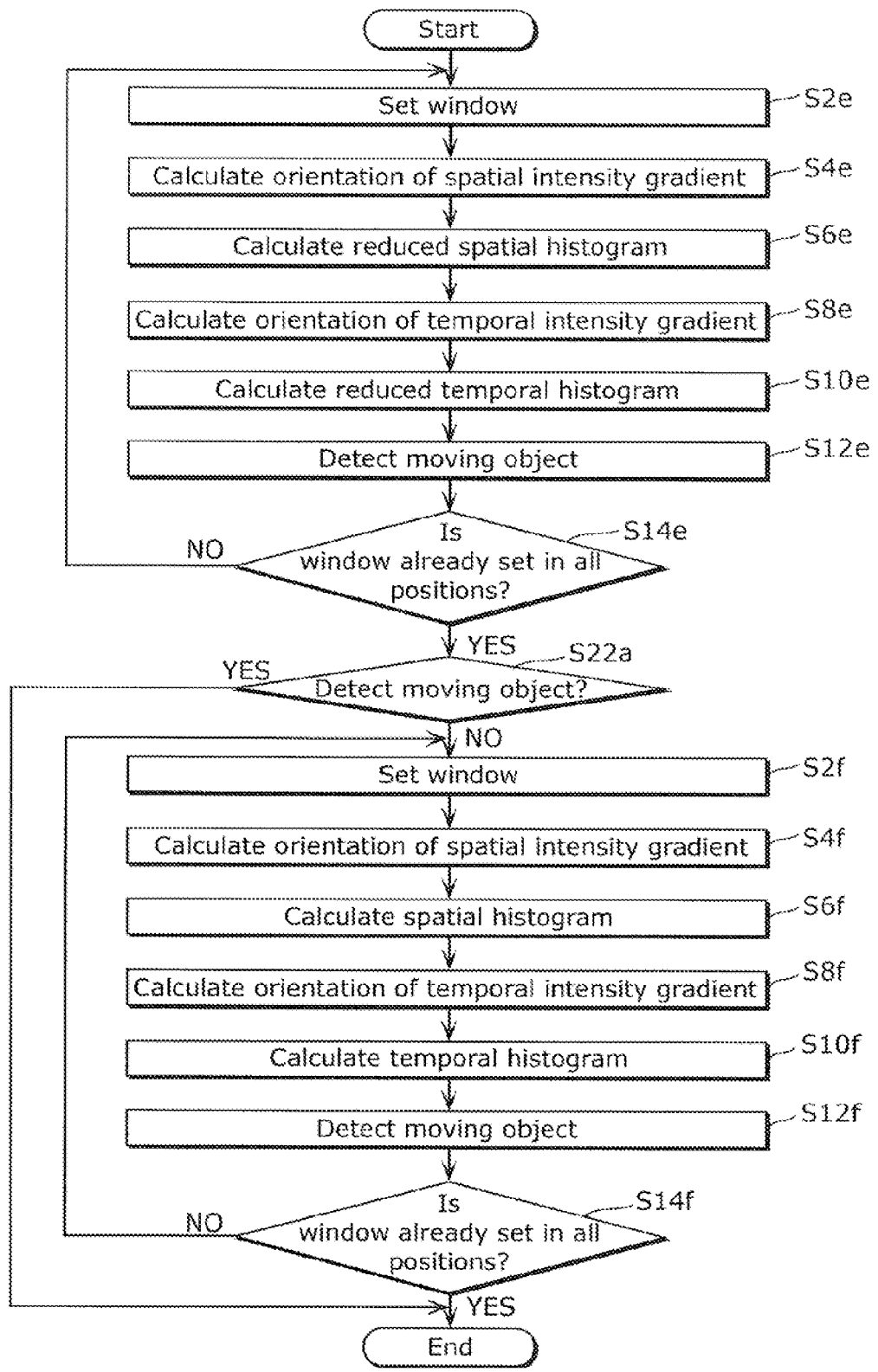

(a)

Image: I (x, y, t)

Optical flow: $u = [u_x, u_y]$

Optical flow direction: $\varphi = \tan^{-1}(u_y/u_x)$ (b)

FIG. 30
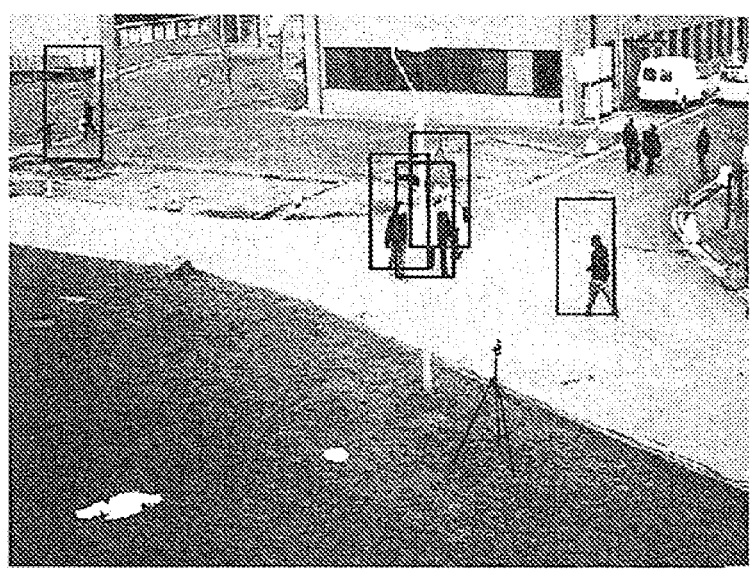
(a)
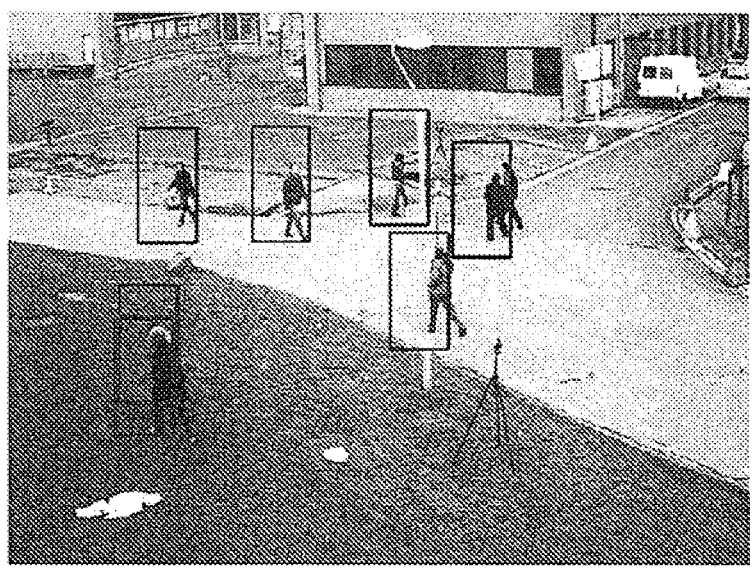
(b)

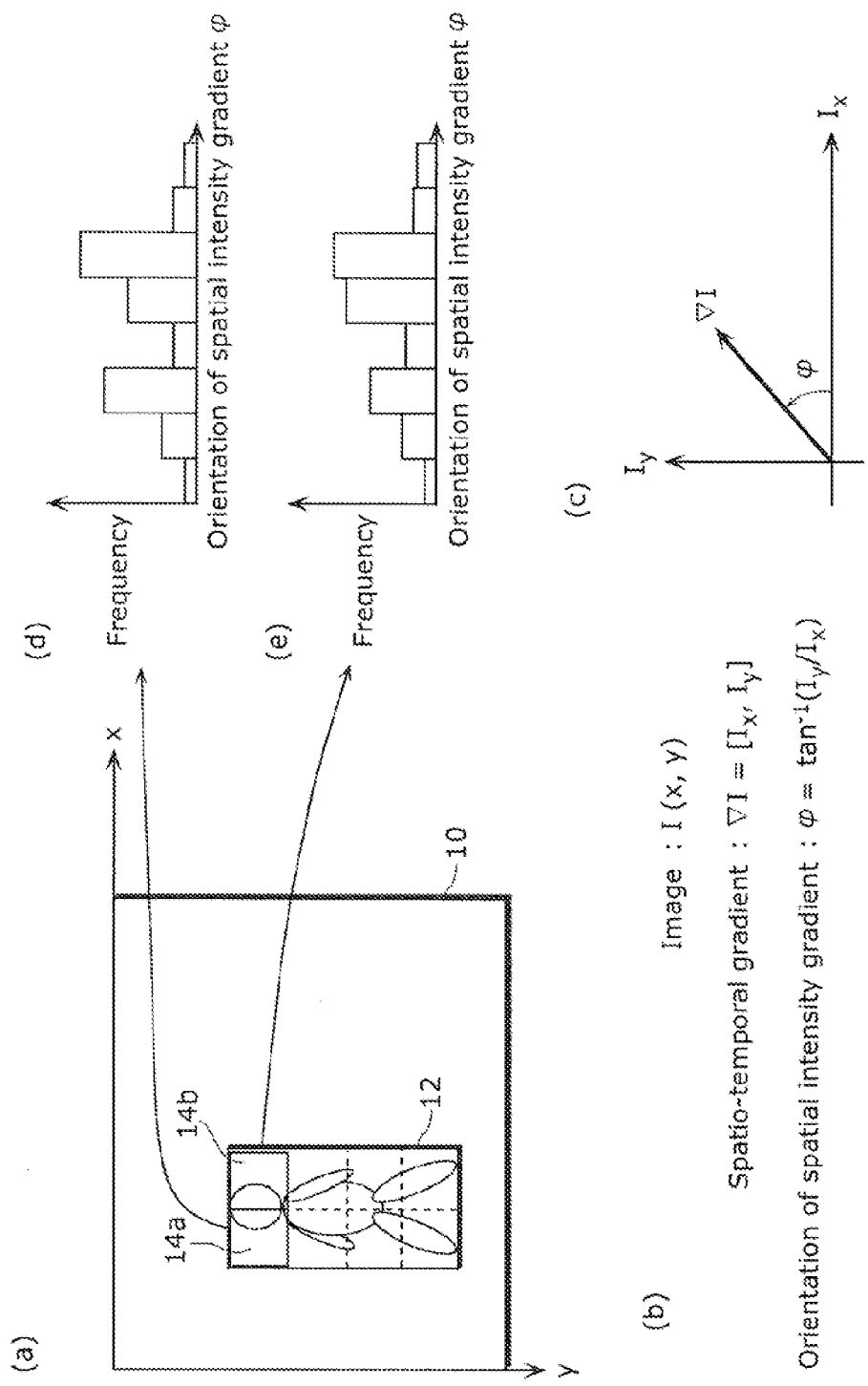

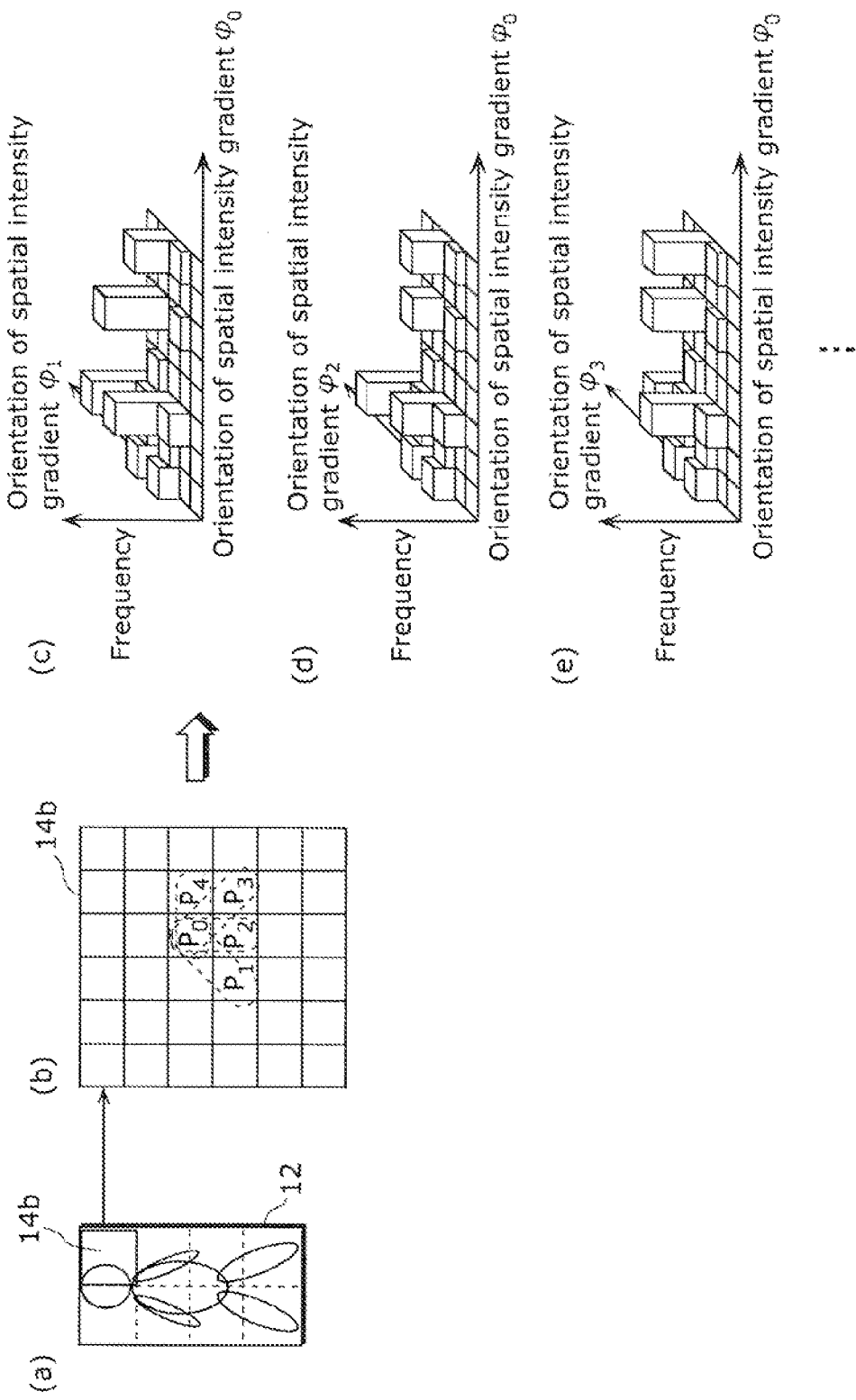

MOVING OBJECT DETECTION DEVICE

TECHNICAL FIELD

The present invention relates to a moving object detection device which detects a moving object from a video.

BACKGROUND ART

Conventionally, techniques for detecting a moving object such as a pedestrian from a video have been developed. The moving object detection techniques are important techniques that can be applied to the techniques for the purpose of surveillance, the detection of a pedestrian by a moving vehicle, or an intelligent robot.

So far, many techniques have been developed. However, it is difficult to detect a pedestrian because the pedestrian is a multi-joint object and can strike various poses, and there are a variety of visions according to the influence of clothing, light from outside, a complicated background, and so on.

As a technique for detecting a person from static image, a technique is known for detecting a person through combination of Histogram of Oriented Gradient (HOG) feature and Adaboost classifier (for example, refer to Non Patent Literature 1).

FIG. 32 is a diagram for explaining a method described in Non Patent Literature 1. As shown in the part (a) of FIG. 32, a window 12 of a predetermined size is set in an input image 10. The window 12 is divided into a plurality of patches (patch 14a, patch 14b, and so on), and the HOG feature is calculated for each of the patches.

For example, a method for calculating the HOG feature of the patch 14a is described with reference to the part (b) of FIG. 32. When an intensity for each of the pixels in the patch 14a is I (x, y), a spatial gradient for each of the pixels $\nabla I = [I_x, I_y]$ is calculated. Moreover, an orientation of spatial intensity gradient for each of the pixels $\phi = \tan^{-1}(I_y/I_x)$ is calculated. A relationship between the spatial gradient $\nabla I$ and the orientation of spatial intensity gradient $\phi$ is shown in the part (c) of FIG. 32. In other words, when a horizontal axis is $I_x$ and a vertical axis is $I_y$, an angle formed by a vector of the spatial gradient $\nabla I$ and the horizontal axis $I_x$ is the orientation of spatial intensity gradient $\phi$. By calculating the frequency of the orientation of spatial intensity gradient $\phi$ for each of the pixels in the patch 14a, a histogram shown in the part (d) of FIG. 32 can be obtained. The histogram is a HOG feature. Similarly, the HOG feature of the patch 14b can be obtained as shown in the part (e) of FIG. 32. By calculating the HOG features for all patches within the window 12 and determining them as input of the Adaboost classifier, the Adaboost classifier determines whether or not a person is included within the window 12. By performing raster scan on the window 12 from the top left corner to the bottom right corner of the input image 10 and determining whether or not a person exists in each of the positions, it is possible for a person included in the input image 10 to be detected.

It should be noted that $\nabla I = [I_x, I_y]$ can be calculated with a general first derivative operator (Sobel, Roberts, Rosenfeld, and so on). Therefore, a detailed description will be omitted.

The CoHOG feature which is obtained by extension of the HOG feature is also known (for example, refer to Non Patent Literature 2). FIG. 33 is a diagram for explaining the CoHOG feature. As shown in the part (a) of FIG. 33, when paying attention to the window 12 as similarly to the part (a) of FIG. 32, the window 12 in divided into a plurality of patches (patch 14b and so on), and the CoHOG feature is calculated for each of the patches.

For example, a method for calculating the CoHOG feature of the patch 14b is described. The part (b) of FIG. 33 is a diagram in which the patch 14b is expanded. First, an orientation of spatial intensity gradient $\phi = \tan^{-1}(I_y/I_x)$ is calculated for each of the pixels within the patch 14b as shown in the part (b) of FIG. 32. Next, the pixel to be focused within the patch 14b is determined as $P_0$. The adjacent pixel on the diagonal bottom left of the pixel $P_0$, the adjacent pixel below the pixel $P_0$, the adjacent pixel on the diagonal bottom right of the pixel $P_0$, and the right adjacent pixel of the pixel $P_0$ are determined as co-occurrence pixels $P_1, P_2, P_3,$ and $P_4$, respectively. Moreover, an orientation of spatial intensity gradient of the pixel $P_0$ is determined as $\phi_0$ and an orientation of spatial intensity gradient of the pixel for co-occurrence $P_i$ (i=1 to 4) is determined as $\phi_i$ (i=1 to 4). When the pixel which pays attention to each of the pixels within the patch 14b is $P_0$, a two-dimensional histogram which determines $\phi_0$ and $\phi_i$ as a pair of variables is generated. The histogram is a CoHOG feature. The part (c) of FIG. 33 shows an example of a two-dimensional histogram which designates $\phi_0$ and $\phi_1$ as a pair of variables. The part (d) of FIG. 33 shows an example of a two-dimensional histogram which designates $\phi_0$ and $\phi_2$ as a pair of variables. The part (e) of FIG. 33 shows an example of a two-dimensional histogram which designates $\phi_0$ and $\phi_3$ as a pair of variables. In the examples shown in FIG. 33, since there are four combinations of the pixel $P_0$ and the pixel for co-occurrence $P_i$ (i=1 to 4), four CoHOG features can be obtained from the patch 14b. By calculating the four CoHOG features for each of all the patches and inputting them to the classifier such as the Adaboost classifier, it is possible to determine whether or not a person exists within the window 12. It should be noted that the co-occurrence $P_i$ is not limited to the adjacent pixel of the target pixel $P_0$, and any pixel is acceptable as long as it is a pixel having a predetermined positional relationship with the pixel $P_0$. Moreover, the number of pixels for co-occurrence $P_i$ is not limited to four, and the number can be selected where appropriate. A technique using the CoHOG feature is known to have higher accuracy than a technique using the HOG feature.

A HOGHOF feature is known as another feature in which the HOG amount is expanded (for example, refer to Non Patent Literatures 3 and 4). Here, HOF represents a histogram for an optical flow direction. For example, when an optical flow for each of the pixels within the patch 14a shown in the part (a) of FIG. 32 is $u=[u_x, u_y]$, the optical flow direction $\psi$ can be calculated to be $\psi = \tan^{-1}(u_y/u_x)$. A histogram is generated also for $\psi$ as well as $\phi$, and the HOF feature is calculated. By using the HOGHOF feature which is a combination of the HOG feature and the HOF feature, human action analysis can be performed. As a method for calculating an optical flow, a differential method, template matching method, and so on can be used. Therefore, a detailed description will be omitted.

Moreover, a 3DHOG feature is known as another feature in which the HOG amount is expanded (for example, refer to Non Patent Literature 5). In the 3DHOG feature, a window having a predetermined volume is set in a three-dimensional video in which static images are arranged in a temporal axis direction. The feature of a spatial shape and the feature of a temporal movement feature for each of the pixels within the window are indicated by one vector. By comparing the vector with a normal vector for each of the surfaces of a virtual polyhedron within the window and by casting a vote for the surface having the closest normal vector, a histogram is generated in which each surface of the polyhedron is designated as a bin (class). The histogram is a 3DHOG feature. By using the 3DHOG feature, human action analysis can be performed.

CITATION LIST

Non Patent Literature

[NPL 1]
N. Dalai and B. Triggs, "Histograms of Oriented Gradients for Human Detection", CVPR, pp. 886-893, 2005
[NPL2]
T. Watanabe, S. Ito, and K. Yokoi, "Co-occurrence Histograms of Oriented Gradients for Pedestrian Detection", PSIVT, 2009
[NPL3]
Ivan Laptev, M. Marszalek, C. Schmid, and B. Rozenfeld, "Learning realistic human actions from movies", CVPR, 2008
[NPL4]
I. Laptev, and P. Perez, "Retrieving actions in movie", ICCV, 2007
[NPL5]
A. Klaser, M. Marszalek, and C. Schmid, "A Spatio-Temporal Descriptor Based on 3D-Gradient", BMVC, pp. 995-1004, 2008

SUMMARY OF INVENTION

Technical Problem

However, the technique using the HOG feature and the technique using the CoHOG feature both use spatial feature of human shape. Therefore, when the person is observed from the side and particularly when the movement in each of the joints such as a pedestrian is large because the silhouette shape of limb part is changing, these techniques are not suitable. The techniques are affected by a change in the background and texture.

Moreover, the technique using the HOGHOF feature is easily affected by variations in illumination and viewpoint, and has a problem that a detection result excessively depends on walking direction of a pedestrian included in training data. For example, the HOGHOF feature has a problem that there are many cases where detection is not performed on the pedestrian walking a slightly different direction from the direction at the training time.

Furthermore, the 3DHOG feature is a feature in which combination of a spatial shape feature and a temporal movement feature, that is, co-occurrence is added. However, the number of combinations of a spatial shape feature and a temporal movement feature of the real pedestrian is extremely large. Therefore, it is difficult to sufficiently express the diversity of the pedestrian with the result that the detection is not performed on the pedestrian with the limited training set.

Moreover, even when the general background difference method is used, a moving object cannot be reliably detected from the video because the method is affected by a change in background.

The present invention is conceived to solve the above mentioned problem. An object of the present invention is to provide a moving object detection device which can reliably detect a moving object from a video without being affected by the complicated background, illumination variations, and so on.

Solution to Problem

In order to attain the above mentioned goal, a moving object detection device according to an aspect of the present invention is a moving object detection device which detects a moving object from a video, the device comprising: a window setting unit configured to set a window having a predetermined volume in the video that is a three-dimensional image in which two-dimensional images are arranged in a temporal axis direction; an orientation of spatial intensity gradient calculation unit configured to calculate, for each pixel included in the window, an orientation of spatial intensity gradient that is an orientation of spatial gradient of intensity; a spatial histogram calculation unit configured to calculate a spatial histogram that is a histogram of the orientation of spatial intensity gradient within the window; an orientation of temporal intensity gradient calculation unit configured to calculate, for each pixel included in the window, an orientation of temporal intensity gradient that is an orientation of temporal gradient of intensity; a temporal histogram calculation unit configured to calculate a temporal histogram that is a histogram of the orientation of temporal intensity gradient within the window; and a determination unit configured to determine whether or not the moving object is included within the window, based on the spatial histogram calculated by the spatial histogram calculation unit and the temporal histogram calculated by the temporal histogram calculation unit.

With this configuration, a spatial histogram showing a distribution of orientations of spatial intensity gradients and a temporal histogram showing a distribution of orientations of temporal intensity gradients are calculated separately, and it is determined whether or not a moving object exists, based on the spatial histogram and the temporal histogram. When the moving object is a pedestrian, the pedestrian generally has many vertical edge components. As a result, it is possible to detect the pedestrian separately from the background with the spatial histogram. Moreover, by adding the temporal histogram, it is possible to detect the moving pedestrian and the non-moving background separately with high accuracy. It should be noted that the configuration does not express the spatial feature and the temporal feature together, as similarly to 3DHOG feature, but expresses the spatial feature and the temporal feature independently. With this, since the background, the diversity of pedestrian, and illumination variations, and other influences are absorbed by each of the spatial feature and the temporal feature, it is possible to reliably detect a moving object even with the limited training set.

Preferably, the above described moving object detection device, further comprises: an optical flow direction calculation unit configured to calculate an optical flow direction for each pixel included in the window; and an optical flow histogram calculation unit configured to calculate an optical flow histogram that is a histogram of the optical flow direction within the window, wherein the determination unit is configured to determine whether or not the moving object is included within the window, based on the spatial histogram calculated by the spatial histogram calculation unit, the temporal histogram calculated by the temporal histogram calculation unit, and the optical flow histogram calculated by the optical flow histogram calculation unit.

With this configuration, by adding an optical flow histogram showing the feature of the direction of the moving object, moving object detection is performed. With this, the moving object can be more reliably detected.

Preferably, the spatial histogram calculation unit is configured to determine, as a first pair of variables, a combination of orientations of spatial intensity gradients including the orientation of spatial intensity gradient of pixels mutually having a predetermined positional relationship, and to calculate a histogram of the first pair of variables within the window, the temporal histogram calculation unit is configured to determine, as a second pair of variables, a combination of orientations of temporal intensity gradients including the orientation of temporal intensity gradient of the pixels mutually having the predetermined positional relationship, and to calculate a histogram of the second pair of variables within the window, the optical flow histogram calculation unit is configured to determine, as a third pair of variables, a combination of optical flow directions including the optical flow direction of the pixels mutually having the predetermined positional relationship, and to calculate a histogram of the third pair of variables within the window, and the determination unit is configured to determine whether or not the moving object is included within the window, based on the histogram of the first pair of variables, the histogram of the second pair of variables, and the histogram of the third pair of variables.

With this configuration, the histogram of the first pair of variables showing co-occurrence of the orientation of spatial intensity gradient within the window, the histogram of the second pair of variables showing the co-occurrence of the orientation of temporal intensity gradient, the histogram of the third pair of variables showing the co-occurrence of the optical flow direction are generated, and then moving object detection is performed based on the three kinds of histograms. In this way, by using the histogram showing the co-occurrence within the time and space of the same feature, moving object detection can be reliably performed.

Moreover, the spatial histogram calculation unit may be configured to determine, as a first pair of variables, a combination of orientations of spatial intensity gradients including the orientation of spatial intensity gradient of pixels mutually having a predetermined positional relationship, and to calculate a histogram of the first pair of variables within the window, the temporal histogram calculation unit may be configured to determine, as a second pair of variables, a combination of orientations of temporal intensity gradients including the orientation of temporal intensity gradient of the pixels mutually having the predetermined positional relationship, and to calculate a histogram of the second pair of variables within the window, and the determination unit may be configured to determine whether or not the moving object is included within the window, based on the histogram of the first pair of variables and the histogram of the second pair of variables.

With this configuration, the histogram of the first pair of variables showing co-occurrence of the orientation of spatial intensity gradient within the window and the histogram of the second pair of variables showing the co-occurrence of the orientation of temporal intensity gradient are generated, respectively. Then moving object detection is performed based on the two kinds of histograms. In this way, by using the histogram showing the co-occurrence within the time and space of the same feature, moving object detection can be reliably performed.

Moreover, the above described moving object detection device may further comprise: a reduced video generation unit configured to generate reduced videos each of which is obtained by reducing the video with one of a plurality of predetermined reduction ratios; a reduced window setting unit configured to set, for each of the reduced videos, a reduced window in the reduced video, to set reduced windows in the reduced videos, the reduced window being obtained by reducing the window with a reduction ratio used in generating the reduced video, the orientation of spatial intensity gradient calculation unit is further configured to calculate, for each of the reduced windows, an orientation of spatial intensity gradient for each pixel included in the reduced window, the spatial histogram calculation unit is further configured to calculate, for each of the reduced windows, a reduced spatial histogram within the reduced window, the orientation of temporal intensity gradient calculation unit is further configured to calculate, for each of the reduced windows, an orientation of temporal intensity gradient for each pixel included in the reduced window, the temporal histogram calculation unit is further configured to calculate, for each of the reduced windows, a reduced temporal histogram within the reduced window, the reduced window setting unit is configured to select each of the reduction ratios as a target reduction ratio in an ascending order starting from a smallest reduction ratio from among the plurality of reduction ratios, and to set the reduced window with the target reduction ratio in the reduced video with the target reduction ratio, the determination unit is configured to determine whether or not the moving object is included in the reduced window with the target reduction ratio, based on the reduced spatial histogram and the reduced temporal histogram with the reduced reduction ratio, the window setting unit is configured to sequentially set the window, in positions within a predetermined area, from a position in the video corresponding to a setting position of the reduced window in the reduced video with the target reduction ratio, when the determination unit determines that the moving object is included in the reduced window, and the determination unit is further configured to determine whether or not the moving object is included within the window set by the window setting unit, when the determination unit determines that the moving object is included in the reduced window.

With this configuration, it is possible for the moving object to be detected in the reduced video, and it is possible for the moving object to be detected in the video of a standard size. In other words, it is possible to roughly detect the position of the moving object in the reduced video, and to detect the detailed position of the moving object in the video of a standard size. The reduced video has less data amount than the video in a standard size. Therefore, the technique makes it possible to rapidly detect the detailed position of the moving object.

Moreover, the moving object detection device further comprises a reduced video generation unit configured to generate reduced videos each of which is obtained by reducing the video with one of a plurality of predetermined reduction ratios, wherein the window setting unit is further configured to set the window in each of the reduced videos, the orientation of spatial intensity gradient calculation unit is further configured to calculate, for each of the reduced videos, an orientation of spatial intensity gradient for each pixel included in the window set in the reduced video, the spatial histogram calculation unit is further configured to calculate, for each of the reduced videos, a reduced spatial histogram within the window set in the reduced video, the orientation of temporal intensity gradient calculation unit is further configured to calculate, for each of the reduced videos, an orientation of temporal intensity gradient for each pixel included in the window set in the reduced video, the temporal histogram calculation unit is further configured to calculate, for each of the reduced videos, a reduced temporal histogram within the window set in the reduced video, and the determination unit is configured to: (a) sequentially select each of the reduction ratios as a target reduction ratio in an ascending order starting from a smallest reduction ratio from among the plurality of reduction ratios until it is determined that the moving object is included within the window, and determine whether or not the moving object is included in the window, based on the reduced spatial histogram and the reduced temporal histogram within the window that is set in the reduced video reduced with the target reduction ratio; and (b) determine whether or not the moving object is included within the window set in the video, based on the spatial histogram and the temporal histogram, when it is determined that the moving object is not included within the window in any of the reduced videos.

With this configuration, the moving object is detected using the window of the same size, and the videos and reduced videos of various sizes. With this, the moving objects of various sizes can be detected.

Moreover, the window setting unit may be configured to set, within the video, windows each having a different predetermined volume, the orientation of spatial intensity gradient calculation unit may be configured to calculate, for each of the windows, an orientation of spatial intensity gradient for each pixel included in the window, the spatial histogram calculation unit may be configured to calculate, for each of the windows, a spatial histogram within the window, the orientation of temporal intensity gradient calculation unit may be configured to calculate, for each of the windows, an orientation of temporal intensity gradient for each pixel included in the window, the temporal histogram calculation unit may be configured to calculate, for each of the windows, a temporal histogram within the window, and the determination unit may be configured to: sequentially select windows having in a descending order starting from a window having a largest volume from among the windows until it is determined that the moving object is included within the window; and determine whether or not the moving object is included within the selected window, based on the spatial histogram and the temporal histogram with respect to the selected window.

With this configuration, the windows having different volumes are set and it is determined whether or not the moving object is included in each of the windows. With this, the moving objects of various sizes can be detected.

It should be noted that the present invention can be implemented not only as a moving object detection device having such processing units with the above described features but also as a method for detecting a moving object that designates, as steps, the processing units included in the moving object detection device. Moreover, it is possible to implement as a program that causes a computer to execute the steps included in the method for detecting a moving object. Moreover, the program can be distributed via a computer-readable nonvolatile recording medium such as a Compact Disc-Read Only Memory (CD-ROM), or a communication network such as the Internet.

Advantageous Effects of Invention

The present invention makes it possible to reliably detect videos from a moving object without the influence of a complicated background and illumination variations.

BRIEF DESCRIPTION OF DRAWINGS

FIG. 11 is a flowchart showing processes performed by a moving object detection device according to Modification 2 of Embodiment 1.

FIG. 13 is a flowchart showing processes performed by a moving object detection device according to Modification 3 of Embodiment 1.

FIG. 30 is a diagram showing detection results of pedestrians using an STHOG feature that is a feature shown in Embodiment 1.

FIG. 32 is a diagram for explaining a method described in Non Patent Literature 1.

FIG. 33 is a diagram for explaining a CoHOG feature.

DESCRIPTION OF EMBODIMENTS

The following will describe a moving object detection device according to embodiments of the present invention with reference to the drawings.

Embodiment 1

Figure 1:
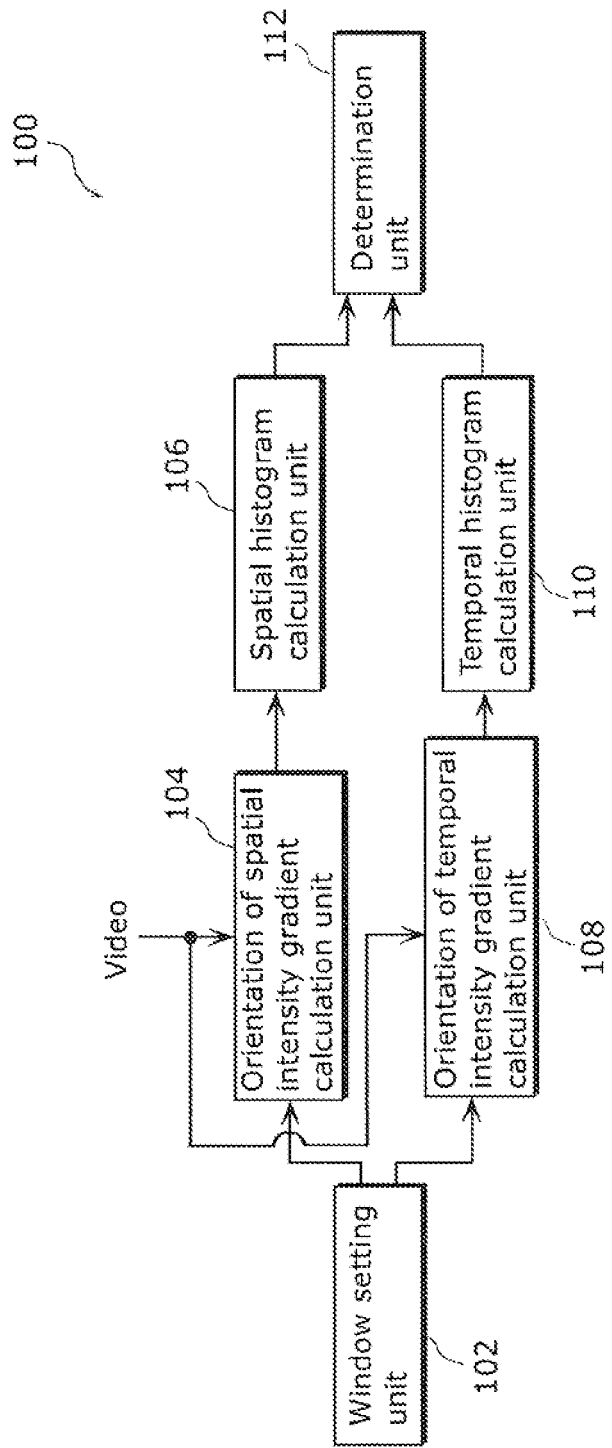
FIG. 1 is a block diagram showing a functional configuration of a moving object detection device according to Embodiment 1.

FIG. 1 is a block diagram showing a functional configuration of a moving object detection device according to Embodiment 1.

A moving object detection device 100 is a device for detecting a moving object from a video, including: a window setting unit 102, an orientation of spatial intensity gradient calculation unit 104, a spatial histogram calculation unit 106, an orientation of temporal intensity gradient calculation unit 108, a temporal histogram calculation unit 110, and a determination unit 112.

The window setting unit 102 sets a window having a predetermined volume in a video that is a three-dimensional image in which two-dimensional images are arranged in a temporal axis direction.

The orientation of spatial intensity gradient calculation unit 104 calculates, for each of the pixels included in the window, an orientation of spatial intensity gradient that is an orientation of spatial gradient of intensity.

The spatial histogram calculation unit 106 calculates a spatial histogram that is a histogram of the orientation of spatial intensity gradient within the window.

The orientation of temporal intensity gradient calculation unit 108 calculates, for each of the pixels included in the window, an orientation of temporal intensity gradient that is an orientation of temporal gradient of intensity.

The temporal histogram calculation unit 110 calculates a temporal histogram that is a histogram of the orientation of temporal intensity gradient within the window.

The determination unit 112 determines whether or not a moving object is included within the window, based on the spatial histogram calculated by the spatial histogram calculation unit and the temporal histogram calculated by the temporal histogram calculation unit.

Figure 2:
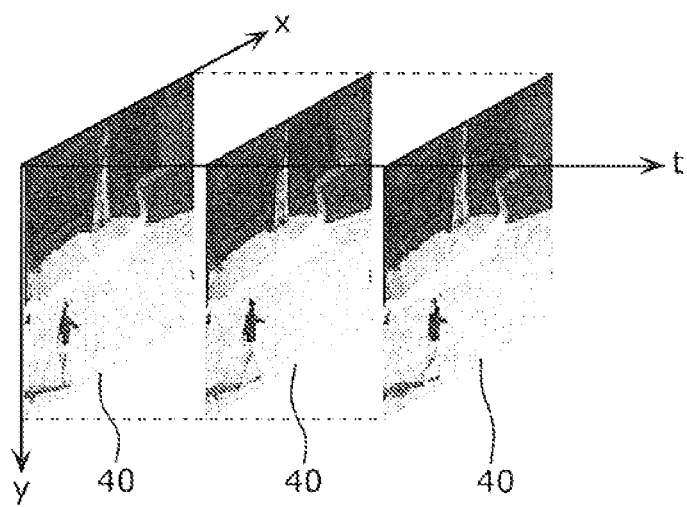
FIG. 2 is a diagram showing an example of a video.

FIG. 2 is a diagram showing an example of a video. A three-dimensional image in which n two-dimensional images 40 (n is an integer greater than or equal to 2) on an xy plane are arranged in a temporal axis t direction is a video. The video is input to the moving object detection device 100.

Figure 3:
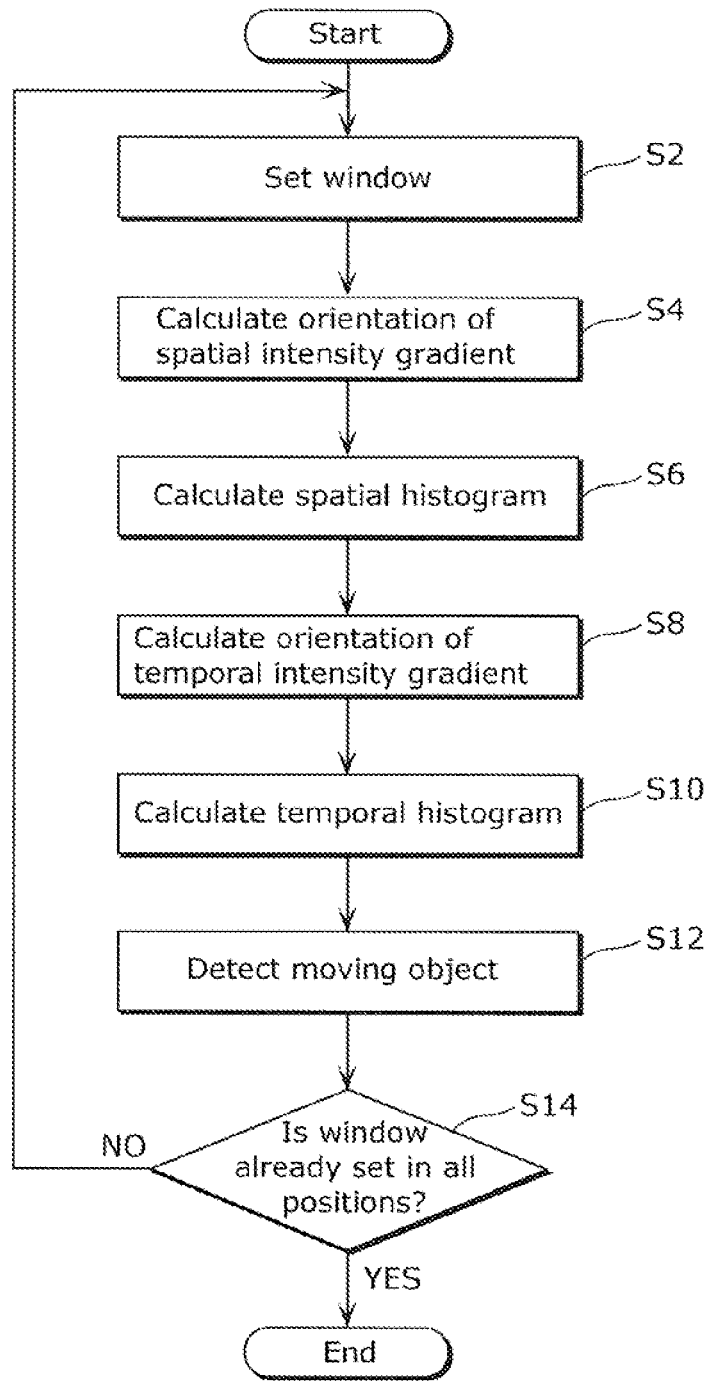
FIG. 3 is a flowchart showing processes performed by a moving object detection device according to Embodiment 1.

FIG. 3 is a flowchart showing processes performed by the moving object detection device 100.

Figure 4:
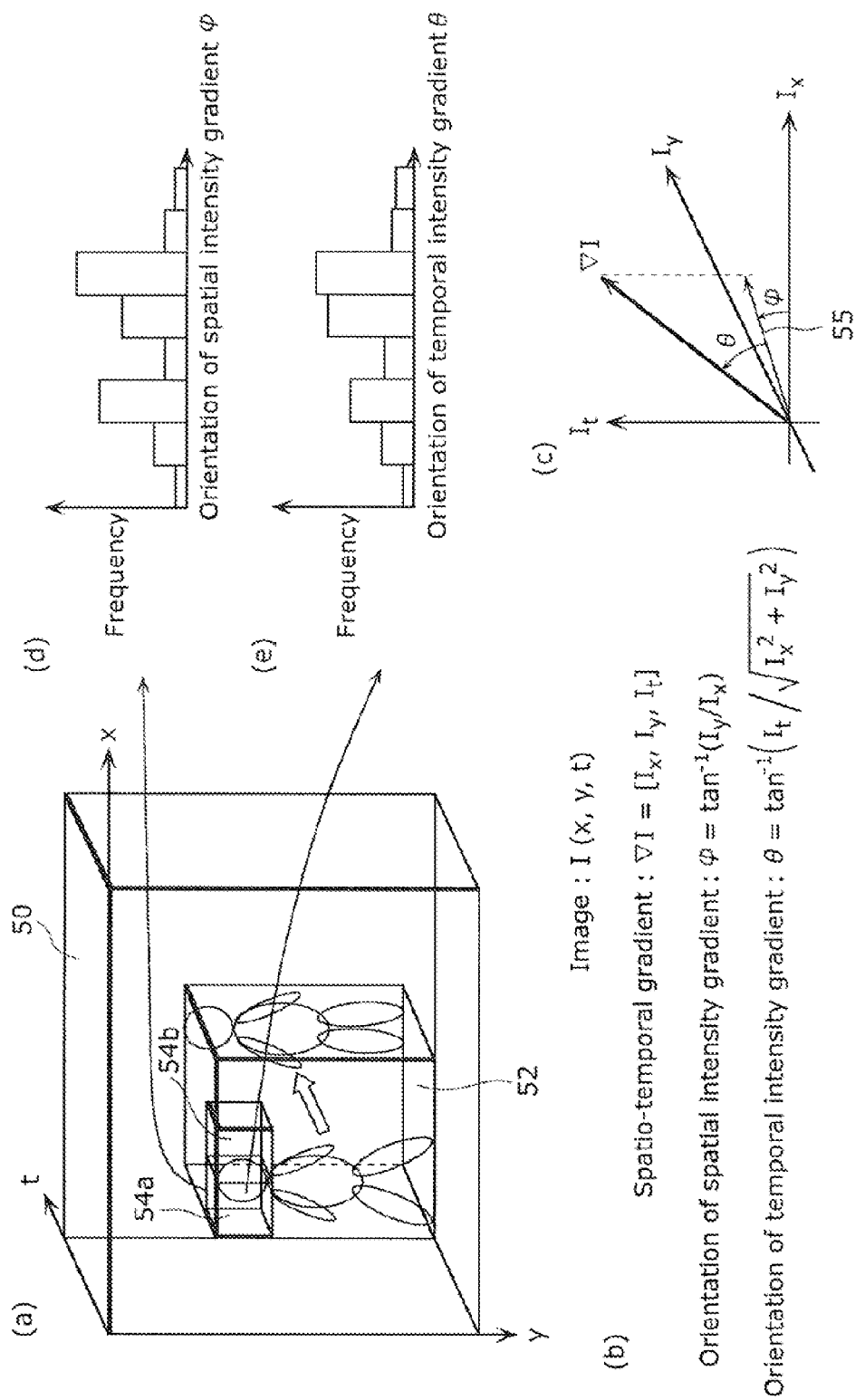
FIG. 4 is a diagram for explaining a feature calculated by a moving object detection device according to Embodiment 1.

With reference to the part (a) of FIG. 4, the window setting unit 102 sets a window 52 within a video 50 (S2). The window 52 has a predetermined width for each of an x-axis direction, a y-axis direction, and a t-axis direction. In other words, the window 52 is not a plane but a rectangular parallelepiped having a predetermined volume. An initial position of the window 52 is, for example, determined as a position in which top left corner coordinates of the window 52 is origin (x, y, t)=(0, 0, 0). It should be noted that the window 52 is divided into a plurality of patches (for example, patches 54a, 54b, and so on). It should be noted that the window 52 does not have to be divided into patches. In that case, the size of the window is equal to the size of the patch. The patch, as similarly to the window 52, is not a plane but a rectangular parallelepiped.

The orientation of spatial intensity gradient calculation unit 104 calculates, for each of the pixels included in the window 52, a orientation of spatial intensity gradient that is an orientation of spatial gradient of intensity (S4). With reference to the part (b) of FIG. 4, when an intensity for each of the pixels within the window 52 is I (x, y, t), the orientation of spatial intensity gradient calculation unit 104 calculates a spatio-temporal gradient for each of the pixels $\nabla I = [I_x, I_y, I_t]$. Moreover, an orientation of spatial intensity gradient $\phi$ for each of the pixels is calculated by the following expression (1). It should be noted that $I_x$ denotes a gradient of an intensity in an x-axis direction, and $I_y$ denotes a gradient of an intensity in a y-axis direction. Moreover, $I_t$ denotes a gradient of an intensity in a temporal axis (t-axis) direction. It should be noted that the values of $I_x$, $I_y$, and $I_t$ can be calculated with a general first derivative operator (Sobel, Roberts, Rosenfeld, and so on). Therefore, a detailed description will be omitted.

$$\phi = \tan^{-1}(I_y/I_x) \quad (1)$$

A relationship between the spatio-temporal gradient $\nabla I$ and the orientation of spatial intensity gradient $\phi$ is shown in the part (c) of FIG. 4. In other words, an angle formed by a vector 55 in which a vector $\nabla I$ in a three-dimensional space in which $I_x$, $I_y$, and $I_t$ are determined as axes is projected to an $I_x I_y$ plane and the $I_x$ axis is an orientation of spatial intensity gradient $\phi$.

The spatial histogram calculation unit 106 calculates, for each of the patches, a spatial histogram that is a histogram of the orientation of spatial intensity gradient $\phi$ within the patch (S6). For example, by quantizing the orientation of spatial intensity gradient $\phi$ at a predetermined width (for example, at the width of 30 degrees) and by counting the frequency of the orientation of spatial intensity gradient $\phi$, the spatial histogram as shown in the part (d) of FIG. 4 is calculated. The spatial histogram calculation unit 106 calculates the spatial histograms for the total number of patches. For example, when the quantization width is set to 30 degrees and the range of values that can be taken by the orientation of spatial intensity gradient $\phi$ is from 0 degree to 180 degrees, the spatial histogram has six bins (=180/30). It should be noted that the spatial histogram shown in the part (d) of FIG. 4 has eight bins.

The orientation of temporal intensity gradient calculation unit 108 calculates, for each of the pixels included in the window 52, an orientation of temporal intensity gradient that is an orientation of temporal gradient of intensity (S8). With reference to the part (b) of FIG. 4, the orientation of temporal intensity gradient calculation unit 108 calculates the orientation of temporal intensity gradient $\theta$ for each of the pixels with the following expression (2).

[Math. 1]

$$\theta = \tan^{-1}(I_t/\sqrt{I_x^2 + I_y^2}) \quad (2)$$

A relationship between the spatio-temporal gradient $\nabla I$ and the orientation of temporal intensity gradient $\theta$ is shown in the part (c) of FIG. 4. In other words, an angle formed by the above described vector 55 and the vector $\nabla I$ is an orientation of temporal intensity gradient $\theta$.

The temporal histogram calculation unit 110 calculates, for each of the patches, a temporal histogram that is a histogram of the orientation of temporal intensity gradient θ within the patch (S10). For example, by quantizing the orientation of temporal intensity gradient θ at a predetermined width (for example, quantized at a width of 30 degrees) and by counting the frequency for each of the bins of the orientation of temporal intensity gradient θ, the temporal histogram as shown in the part (e) of FIG. 4 is calculated. The temporal histogram calculation unit 110 calculates the temporal histograms for the total number of patches.

Figure 5:
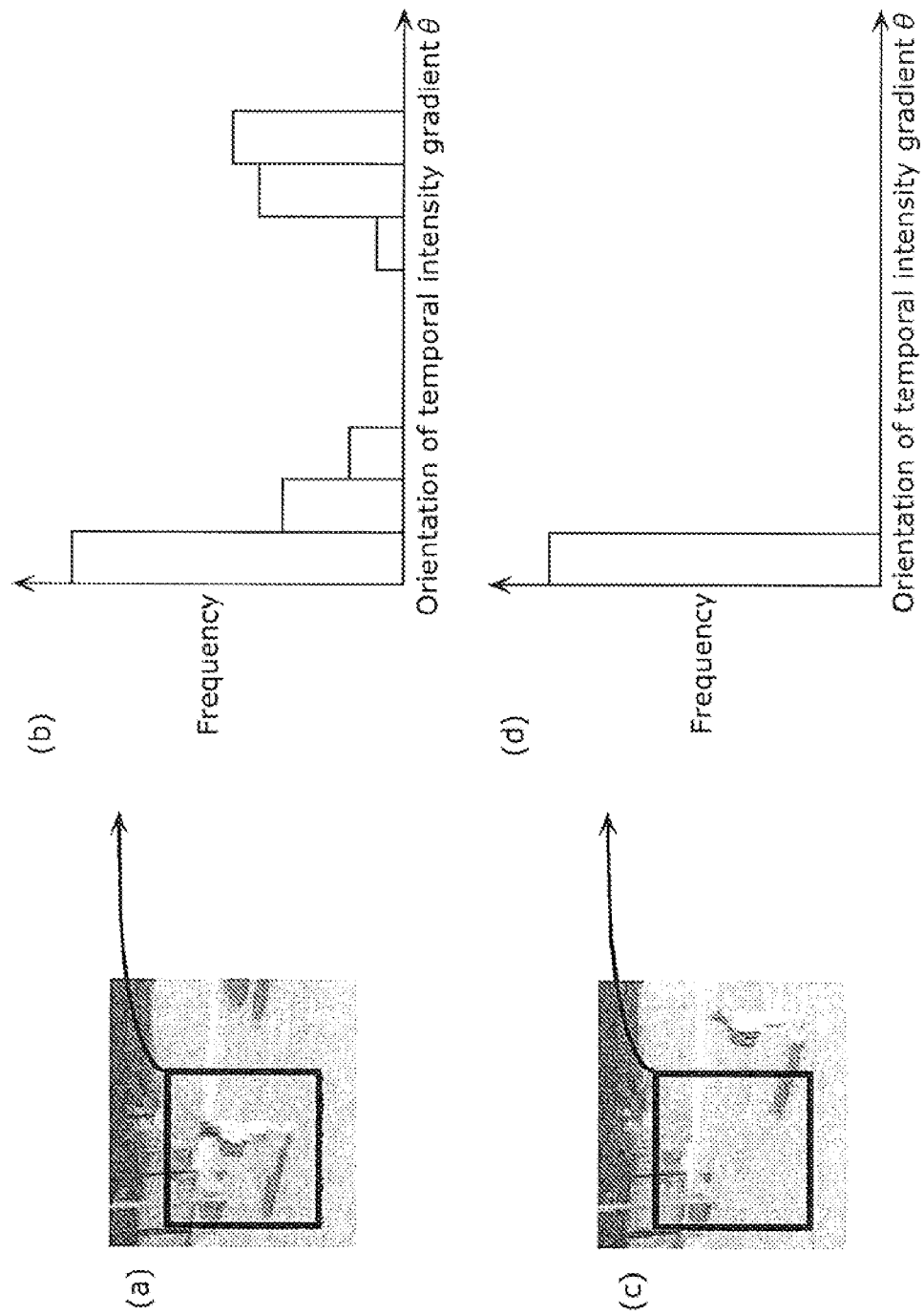
FIG. 5 is a diagram showing a feature of a temporal histogram.

FIG. 5 is a diagram showing the feature of the temporal histogram. When a pedestrian is included in a patch as shown in the part (a) of FIG. 5, orientations of temporal intensity gradients θ in various directions are included within the patch due to the influence of swinging arms and legs. Therefore, the frequency disperses in the form of various bins in the temporal histogram as shown in the part (b) of FIG. 5. In contrast, when only a background is included within the patch as shown in the part (c) of FIG. 5, the background lacks the change in intensity in a temporal axis direction. Therefore, the orientations of temporal intensity gradients θ are concentrated on 0 degree. Moreover, even when tree leaves swaying in the breeze are included in the background, the shape feature and the temporal movement feature of the swaying of leaves are different from those of a pedestrian. Therefore, it is possible to prevent error detection as a pedestrian. For example, from the background portion, the histogram shown in the part (d) of FIG. 5 can be obtained.

The determination unit 112 receives, as an input feature, the spatial histograms for the number of patches calculated by the spatial histogram calculation unit 106 and the temporal histograms for the number of patches calculated by the temporal histogram calculation unit 110, and then determines whether or not a moving object is included within the window 52, based on the input feature (S12). As a method for detecting (determining) a moving object, general techniques such as Adaboost, Support Vector Machine (SVM), and neural network can be used. Therefore, a detailed description will not be repeated. It should be noted that a positive sample that is a video of the pedestrian and a negative sample that is a video of the background are used for training by the determination unit 112.

The window setting unit 102 determines whether or not the window 52 has been set in all positions within the video 50 (S14). When the window 52 has been set in all the positions (YES in S14), the moving object detection device 100 ends the process. When the window 52 is not set in all the positions (NO in S14), the window setting unit 102 sets the window 52 in the pending positions (S2) and then the moving object detection device 100 performs the S4 and the following processes for the set window 52.

It should be noted that as a way to scan the window, for example, by designating, as an initial position, a position in which the coordinates at the above described top left corner of the window 52 is an origin, raster scan is performed on the plane of t=0 from the top left corner to the bottom right corner of the window 52. Next, a single increment is performed on t and then the similar raster scan is performed. By sequentially repeating the processes, the window setting unit 102 sets the window 52 in all the positions within the video 50.

As described above, the moving object detection device according to Embodiment 1 separately calculates a spatial histogram showing a distribution of orientations of spatial intensity gradients and a temporal histogram showing a distribution of orientations of temporal intensity gradients, and determines whether or not a moving object exists, based on the spatial histogram and the temporal histogram. When the moving object is a pedestrian, the pedestrian generally has many vertical edge components. As a result, it is possible to detect the pedestrian separately from the background with the spatial histogram. Moreover, by adding the temporal histogram, it is possible to detect the moving pedestrian and the static background separately with high accuracy. It should be noted that the configuration does not express the spatial feature and the temporal feature together, as similarly to 3DHOG feature, but expresses the spatial feature and the temporal feature independently. Therefore, by absorbing the diversity of the pedestrian and the background and illumination variations by each of the features, it is possible to reliably detect the moving object.

Modification 1 of Embodiment 1

In above described Embodiment 1, the moving object is detected from one video. However, by generating an image pyramid that stratifies the videos according to resolution, it is possible to sequentially detect the moving object from the video having low resolution to the video having high resolution.

Figure 6:
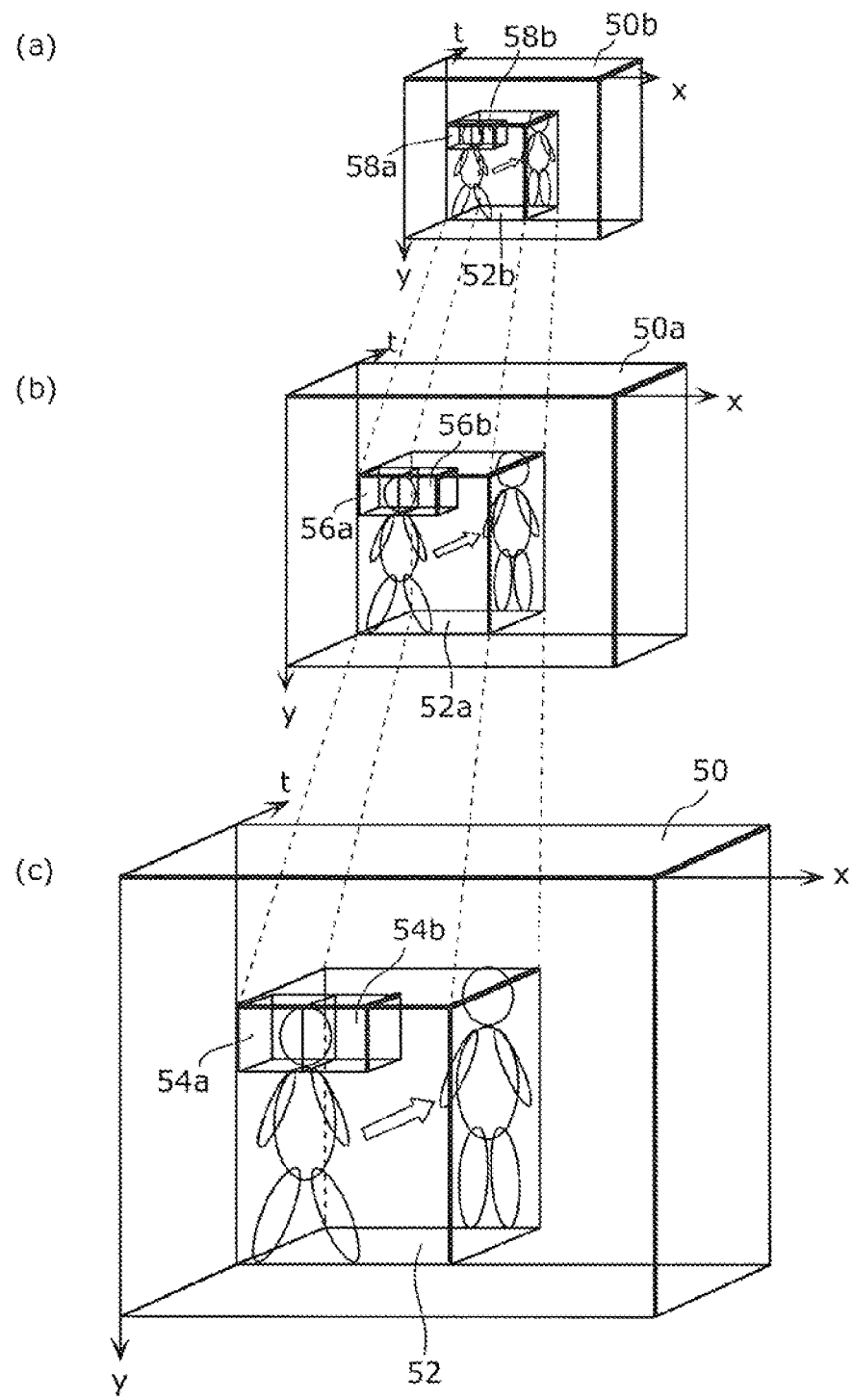
FIG. 6 is a diagram showing an example of an image pyramid generated by a moving object detection device according to Modification 1 of Embodiment 1.

FIG. 6 is a diagram for explaining the image pyramid. From an order from the part (a) of FIG. 6 and the part (b) of FIG. 6 to the part (c) of FIG. 6, the resolution of the video is decreasing. Reduced videos 50b and 50a shown in the part (a) of FIG. 6 and the part (b) of FIG. 6 are each generated by reducing the video 50 shown in the part (c) of FIG. 6 with a different magnification factor.

Figure 7:
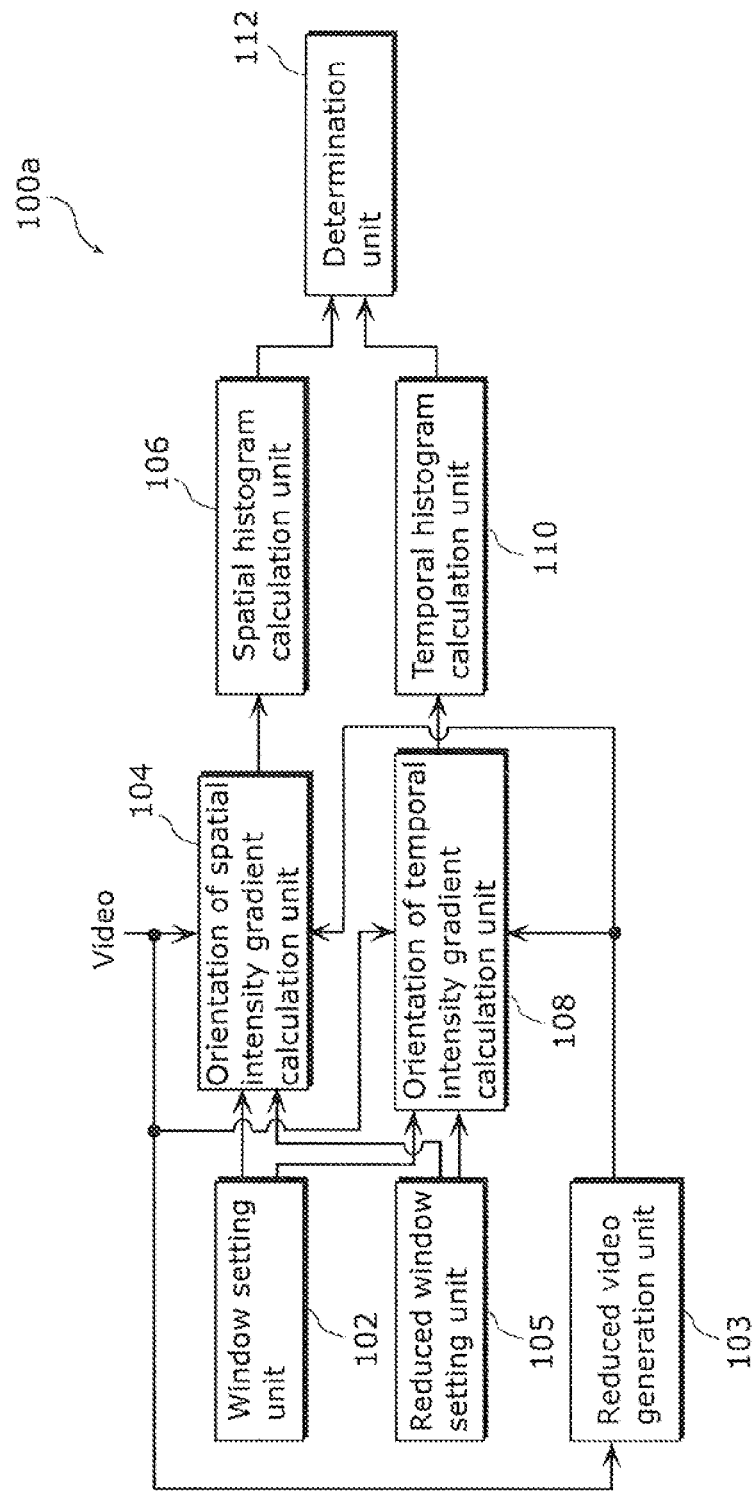
FIG. 7 is a block diagram showing a functional configuration of a moving object detection device according to Modification 1 of Embodiment 1.

FIG. 7 is a block diagram showing a functional configuration of a moving object detection device according to Modification 1 of Embodiment 1.

A moving object detection device 100a is a device for detecting a moving object from a video, including a window setting unit 102, a reduced video generation unit 103, a reduced window setting unit 105, an orientation of spatial intensity gradient calculation unit 104, a spatial histogram calculation unit 106, an orientation of temporal intensity gradient calculation unit 108, a temporal histogram calculation unit 110, and a determination unit 112.

The window setting unit 102 in the present modification has the same configuration as the window setting unit 102 shown in Embodiment 1.

The reduced video generation unit 103 generates, from the video 50, reduced videos (for example, reduced video 50b and 50a) each of which is obtained by reducing the video 50 with one of the predetermined reduction ratios. In other words, the reduced video generation unit 103 generates the reduced videos 50a and 50b each of which is obtained by reducing the video 50 with one of the predetermined reduction ratios.

The reduced window setting unit 105 sets, within each of the reduced videos, a reduced window which is obtained by reducing the window 52 with any one of the predetermined reduction ratios (for example, a reduced window 52a shown in the part (b) of FIG. 6 and a reduced window 52b shown in the part (a) of FIG. 6). In other words, the reduced window setting unit 105 sets the reduced windows 52a and 52b in the reduced videos 50a and 50b, respectively, by setting, for each of the reduced videos 50a and 50b, the reduced window that is reduced with the reduction ratio used when the reduced video is generated from the window 52. It should be noted that the reduced window setting unit 105 sequentially selects each of the reduction ratios as the target reduction ratio in an ascending order staring from a smallest reduction ratio, and sets the reduced window having the target reduction ratio within the reduced video having the target reduction ratio.

In addition to the process performed by the orientation of spatial intensity gradient calculation unit 104 shown in Embodiment 1, the orientation of spatial intensity gradient calculation unit 104 further calculates, for each of the reduced windows, an orientation of spatial intensity gradient for each of the pixels included in a corresponding one of the reduced windows.

In addition to the process performed by the spatial histogram calculation unit 106 shown in Embodiment 1, the spatial histogram calculation unit 106 further calculates, for each of the reduced windows, a reduced spatial histogram that is a histogram of the orientation of spatial intensity gradient within the reduced window.

In addition to the process performed by the orientation of temporal intensity gradient calculation unit 108 shown in Embodiment 1, the orientation of temporal intensity gradient calculation unit 108 further calculates, for each of the reduced windows, an orientation of temporal intensity gradient for each of the pixels included in a corresponding one of the reduced windows.

In addition to the process performed by the temporal histogram calculation unit 110 shown in Embodiment 1, the temporal histogram calculation unit 110 further calculates, for each of the reduced windows, a reduced temporal histogram that is a histogram of the orientation of temporal intensity gradient within the reduced window.

The determination unit 112 determines whether or not the moving object is included within the reduced window having the target reduction ratio, based on the reduced spatial histogram and the reduced temporal histogram that have the target reduction ratio.

When the determination unit 112 determines that the moving object is included within the reduced window, the window setting unit 102 sequentially sets the windows 52 in positions within a predetermined area from the position within the video 50 that is corresponding to the setting position of the reduced window within the reduced video having the target reduction ratio.

The determination unit 112 further determines whether or not the moving object is included within the window 52 when the determination unit 112 determines that the moving object is included within the reduced window.

Figure 8:
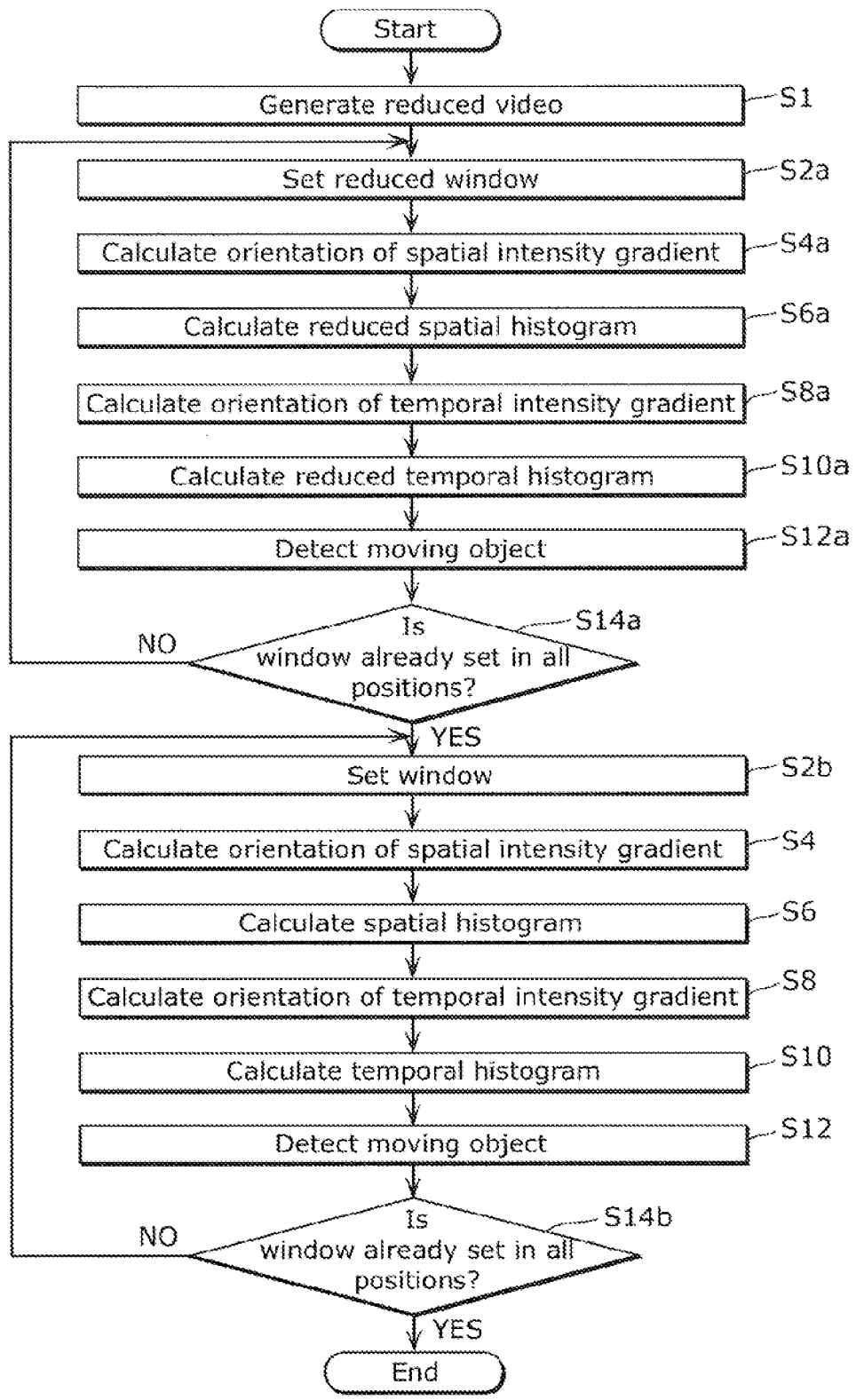
FIG. 8 is a flowchart showing processes performed by a moving object detection device according to Modification 1 of Embodiment 1.

FIG. 8 is a flowchart showing process performed by the moving object detection device 100a.

It should be noted that in the flowchart, description will be made by assuming that there is one reduced moving data item for simplifying the description. However, by preparing the reduced videos having different reduction ratios, the similar processes may be performed.

With reference to FIG. 6, the reduced video generation unit 103 generates a reduced video 50a by reducing the video 50 with a predetermined reduction ratio (S1).

Next, the reduced window setting unit 105 sets, within the reduced video 50a, a reduced window 52a that is obtained by reducing the video 50 with a predetermined reduction ratio (S2a).

The orientation of spatial intensity gradient calculation unit 104 calculates an orientation of spatial intensity gradient φ for each of the pixels included in the reduced window 52a (S4a).

The spatial histogram calculation unit 106 calculates, for each of the patches included in the reduced window 52a (for example, the patch 56a or the patch 56b), a reduced spatial histogram that is a histogram of the orientation of spatial intensity gradient φ within the patch (S6a).

The orientation of temporal intensity gradient calculation unit 108 calculates an orientation of temporal intensity gradient θ for each of the pixels included in the reduced window 52a (S8a).

The temporal histogram calculation unit 110 calculates, for each of the patches included in the reduced window 52a (for example, the patch 56a or the patch 56b), a reduced temporal histogram that is a histogram of the orientation of temporal intensity gradient θ within the patch (S10a).

The determination unit 112 receives, as an input feature, the reduced spatial histograms for the number of patches calculated by the spatial histogram calculation unit 106 and the reduced temporal histograms for the number of patches calculated by the temporal histogram calculation unit 110, and then determines whether or not the moving object is included within the reduced window 52a, based on the input feature (S12a).

The processes of S2a to S12a are the same as the processes of S2 to S12 shown in FIG. 3, except that the size of the video and the size of the window are smaller.

The reduced window setting unit 105 determines whether or not the reduced window 52a has been set in all positions within the reduced video 50a (S14a). When there are positions in which the reduced window 52a are not set (NO in S14a), the reduced window setting unit 105 sets the reduced window 52a in the pending positions (S2b) and then the moving object detection device 100a performs S4a and the following processes on the set reduced window 52a. It should be noted that a way to scan the window is the same as the way according to Embodiment 1.

When the reduced window 52a has been set in all the positions (YES in S14a), the moving object detection device 100a finds the detailed position of the moving object by searching the vicinity of the position of the moving object obtained by the processes of S1 to S14a.

In other words, when the determination unit 112 determines that the moving object is included within the reduced window 52a, the window setting unit 102 sequentially sets the window 52 in positions within a predetermined area from the position within the video 50 that corresponds to the setting positions of the reduced window 52a within the reduced video 50a (S2b). For example, the predetermined area may be an n×n area which determines the position within the video 50 as a central pixel (n is an integer greater than or equal to 2). It should be noted that the position within the video 50 that corresponds to the setting position of the reduced window 52a is, for example, a position obtained by multiplying, by n times, xyz coordinates of the setting position of the reduced window 52a when the reduced video 50a is reduced to 1/n for each of the x, y, and z-axis directions.

Next, the moving object detection device 100a determines whether or not the moving object is included within the window 52 by performing the processes of S4 to S12. The processes of S4 to S12 are the same as the processes of S4 to S12 shown in FIG. 3.

The window setting unit 102 determines whether or not the window 52 has been set in all positions of the above described predetermined area within the video 50 (S14b). When the window 52 has been set for all the positions (YES in S14b), the moving object detection device 100a ends the process. When the window 52 is not set for all the positions (NO in S14b), the window setting unit 102 sets the window 52 at the pending positions (S2b) and then the moving object detection device 100a performs the S4 and the following processes on the set window 52. It should be noted that a way to scan the window is the same as the way according to Embodiment 1.

As described above, the moving object detection device according to Modification 1 of Embodiment 1 can detect the moving object in the reduced video and can further detect the moving object in the video of a standard size. In other words, the moving object detection device can roughly detect the position of the moving object in the reduced video, and can detect the detailed position of the moving object in the video of a standard size. The reduced video has less data amount than the video of a standard size. Therefore, the technique makes it possible to detect the detailed position of the moving object rapidly. When the number of layers is increased, the search range is smaller. As a result, the position of the moving object can be detected rapidly.

Modification 2 of Embodiment 1

In Modification 1 of Embodiment 1, the detection of the moving object is performed using the reduced video and the reduced window. In other words, the reduced window is set in accordance with the reduction ratio for the reduced video. In contrast, in Modification 2 of Embodiment 1, the detection of the moving object is performed using the window of a constant size regardless of the reduction ratio for the reduced video.

Figure 9:
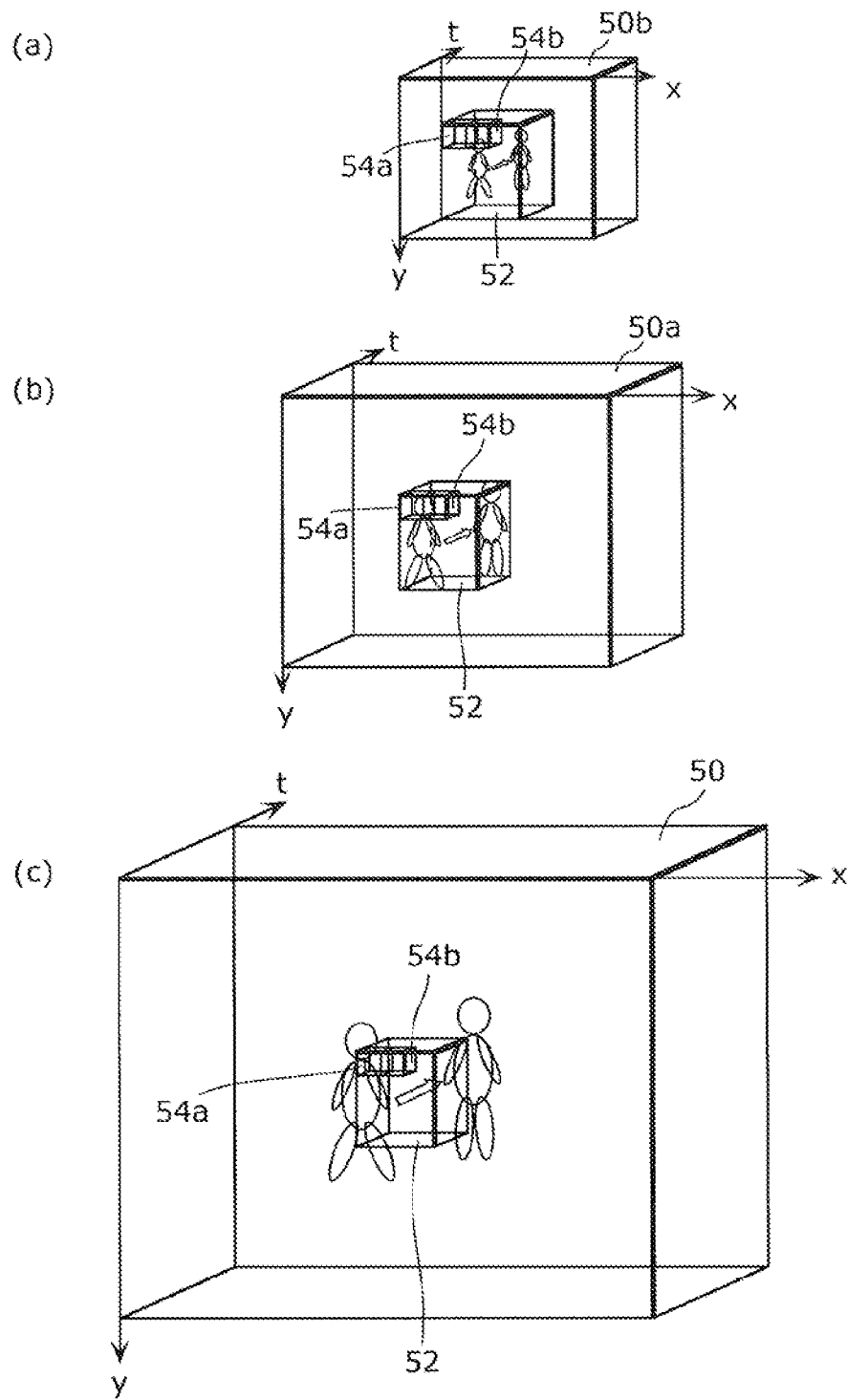
FIG. 9 is a diagram showing an example of an image pyramid generated by a moving object detection device according to Modification 2 of Embodiment 1.

FIG. 9 is a diagram for explaining the image pyramid. From an order from the part (a) of FIG. 9 and the part (b) of FIG. 9 to the part (c) of FIG. 9, the resolution of the video is decreasing. Reduced videos 50b and 50a shown in the part (a) of FIG. 9 and the part (b) of FIG. 9 are generated by reducing the video 50 shown in the part (c) of FIG. 9 at a different magnification factor.

Figure 10:
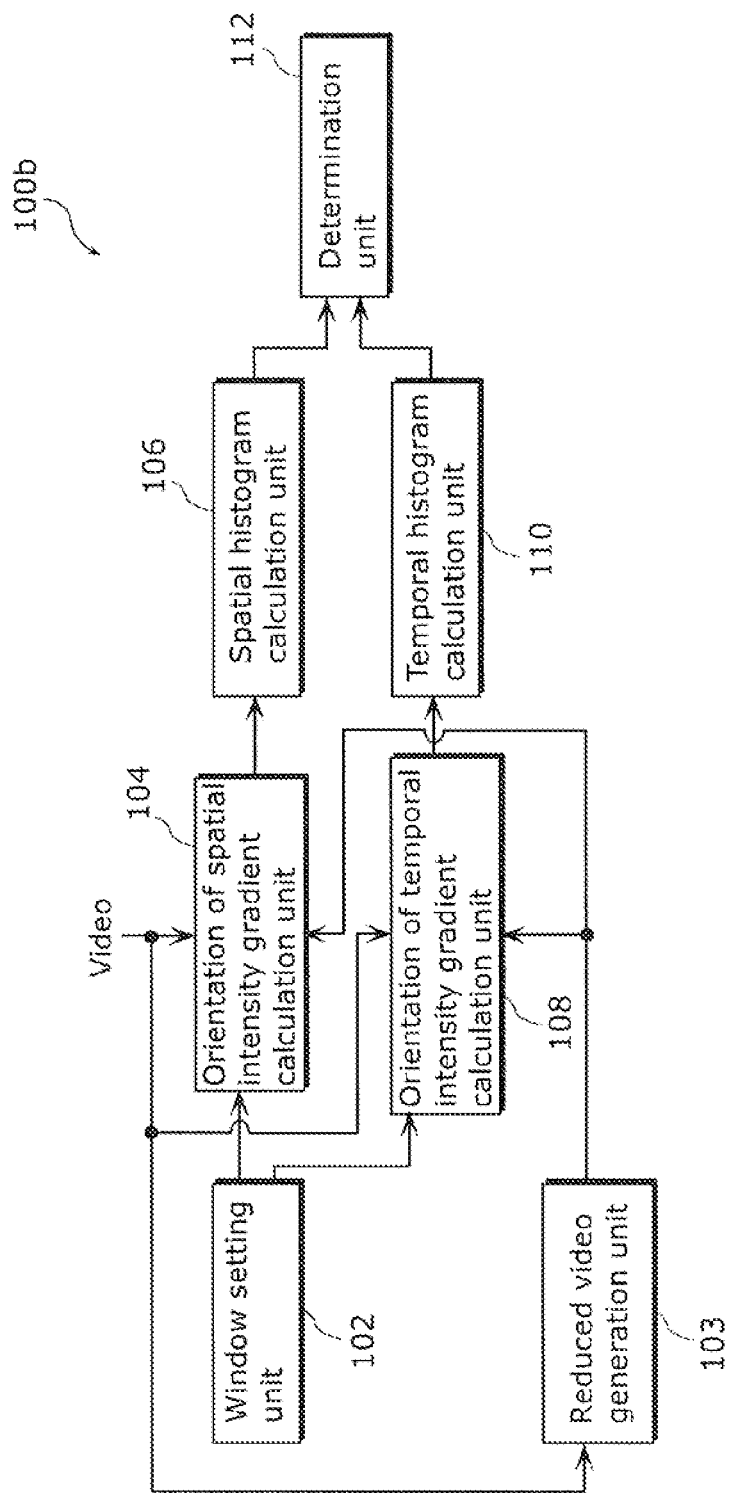
FIG. 10 is a block diagram showing a functional configuration of a moving object detection device according to Modification 2 of Embodiment 1.

FIG. 10 is a block diagram showing a functional configuration of a moving object detection device according to Modification 2 of Embodiment 1.

A moving object detection device 100b is a device for detecting the moving object from a video, including a window setting unit 102, a reduced video generation unit 103, an orientation of spatial intensity gradient calculation unit 104, a spatial histogram calculation unit 106, an orientation of temporal intensity gradient calculation unit 108, a temporal histogram calculation unit 110, and a determination unit 112.

The window setting unit 102 in the present modification has the same configuration as the window setting unit 102 shown in Embodiment 1.

The reduced video generation unit 103 in the present modification has the same configuration as the reduced video generation unit 103 shown in Modification 1 of Embodiment 1. In other words, the reduced video generation unit 103 generates the reduced videos 50a and 50b each of which is obtained by reducing the video 50 with one of the predetermined reduction ratios.

The orientation of spatial intensity gradient calculation unit 104, the spatial histogram calculation unit 106, the orientation of temporal intensity gradient calculation unit 108, and the temporal histogram calculation unit 110 each have the same configuration as those shown in Modification 1 of Embodiment 1.

The determination unit 112 (a) selects each of the reduction ratios as a target reduction ratio in an ascending order starting from a smallest reduction ratio from among a plurality of reduction ratios until it is determined that the moving object is included within the window, and determines whether or not the moving object is included within the window, based on the reduced spatial histogram and the reduced temporal histogram within the window that are set in the reduced video reduced with a target reduction ratio. The determination unit 112 (b) determines whether or not the moving object is included within the window set in the video 50, based on the spatial histogram and the temporal histogram, when the moving object is not included within the window of any of the reduced videos.

For example, with reference to FIG. 9, the determination unit 112 determines whether or not the moving object is included within the window 52 while scanning the window 52 within the reduced video 50b as shown in the part (a) of FIG. 9. When it is determined that the moving object is included within the reduced video 50b, the determination unit 112 ends the process. When it is determined that the moving object is not included within the reduced video 50b, the determination unit 112 and when it is determined that the moving object is included in the reduced video 50a which is used for determining whether or not moving object is included within the window 52 while scanning the window 52 within the reduced video 50a as shown in the part (b) of FIG. 9, the determination unit ends the process. When it is determined that the moving object is not included within the reduced video 50a, the determination unit 112 determines whether or not the moving object is included within the window 52 while scanning the window 52 within the video 50 as shown in the part (c) of FIG. 9.

FIG. 11 is a flowchart showing processes performed by the moving object detection device 100b.

It should be noted that in the flowchart, description will be made by assuming that there is one reduced video for simplifying the description. However, by preparing the reduced videos having different reduction ratios, the similar processes may be performed.

With reference to FIG. 11, the reduced video generation unit 103 generates a reduced video 50a by reducing the video 50 with a predetermined reduction ratio (S1).

Next, the window setting unit 102 sets the window 52 within the reduced video 50a (S2c).

The orientation of spatial intensity gradient calculation unit 104 calculates an orientation of spatial intensity gradient φ for each of the pixels included in the window 52 (S4c).

The spatial histogram calculation unit 106 calculates, for each of the patches included in the window 52, (for example, the patch 54a or the patch 54b), a reduced spatial histogram that is a histogram of the orientation of spatial intensity gradient φ within the patch (S6c).

The orientation of temporal intensity gradient calculation unit 108 calculates an orientation of temporal intensity gradient θ for each of the pixels included in the window 52 (S8c).

The temporal histogram calculation unit 110 calculates, for each of the patches included in the window 52 (for example, the patch 54a or the patch 54b), a reduced temporal histogram that is a histogram of the orientation of temporal intensity gradient θ within the patch (S10c).

The determination unit 112 receives, as an input feature, the reduced spatial histograms for the number of patches calculated by the spatial histogram calculation unit 106 and the reduced temporal histograms for the number of patches calculated by the temporal histogram calculation unit 110, and then determines whether or not the moving object is included within the window 52, based on the input feature (S12c).

The processes of S2c to S12c are the same as the processes of S2 to S12 shown in FIG. 3, except that the size of the video is smaller.

The window setting unit 102 determines whether or not the window 52 has been set in all positions within the reduced video 50a (S14c). When the window 52 is not set in all the positions (NO in S14c), the window setting unit 102 sets the window 52 at the pending positions (S2c) and then the moving object detection device 100b performs the S4c and the following processes on the set window 52. It should be noted that a way to scan the window is the same as the way according to Embodiment 1.

When the window 52 has already been set in all the positions (YES in S14c) and the moving object is detected within the reduced video 50a (YES in S22), the moving object detection device 100b ends the process.

When the window 52 has already been set in all the positions (YES in 514c) and the moving object is not detected within the reduced video 50a (NO in S22), the moving object detection device 100b performs the detection of the moving object by scanning the window 52 of the same size on the video 50 having a size that is larger than the size of the reduced video 50a (S2d to S14d).

The processes of S2d to S14d are the same as the processes of S2c to S14c, except that the target image to scan the window 52 is different. Therefore, a detailed description will not be repeated.

As described above, the moving object detection device according to Modification 2 of Embodiment 1 can detect the moving object in the reduced video, and can detect the moving object in the video of a standard size when the moving object is not found. In other words, since the position of the moving object of a large size can be detected in the reduced video with rough resolution, it is possible to rapidly detect the moving object. Moreover, since the position of the moving object of a small size can be detected in the video of a standard size, it is possible to detect the moving object with high accuracy. In other words, with the configuration according to Modification 2 of Embodiment 1, the moving object is detected using the window of the same size, and the videos and reduced videos of various sizes. With this, the moving objects of various sizes can be detected.

Modification 3 of Embodiment 1

In Modification 1 of Embodiment 1, the detection of the moving object is performed using the reduced video and the reduced window. In other words, the reduced window is set in accordance with the reduction ratio for the reduced video. In contrast, in Modification 3 of Embodiment 1, the detection of the moving object is performed using the windows of a plurality of sizes, without using the reduced video. In other words, the detection of the moving object is performed by scanning the windows of various sizes in the same video.

A functional configuration of a moving object detection device according to Modification 3 of Embodiment 1 is the same as the functional configuration of the moving object detection device according to Embodiment 1 shown in FIG. 1.

In other words, the moving object detection device 100 is a device for detecting a moving object from a video, including: a window setting unit 102, an orientation of spatial intensity gradient calculation unit 104, a spatial histogram calculation unit 106, an orientation of temporal intensity gradient calculation unit 108, a temporal histogram calculation unit 110, and a determination unit 112.

The window setting unit 102 sets, in the video, a plurality of windows each having a different predetermined volume.

The orientation of spatial intensity gradient calculation unit 104 calculates, for each of the windows, an orientation of spatial intensity gradient for each of the pixels included in the window.

The spatial histogram calculation unit 106 calculates, for each of the windows, a spatial histogram within the window.

The orientation of temporal intensity gradient calculation unit 108 calculates, for each of the windows, an orientation of temporal intensity gradient for each of the pixels included in the window.

The temporal histogram calculation unit 110 calculates, for each of the windows, a temporal histogram within the window.

The determination unit 112 sequentially selects windows in a descending order starting from the window of the largest volume from among the plurality of windows until it is determined that the moving object is included within the window, and then determines whether or not the moving object is included within the selected window based on the spatial histogram and the temporal histogram with respect to the selected window.

Figure 12A:
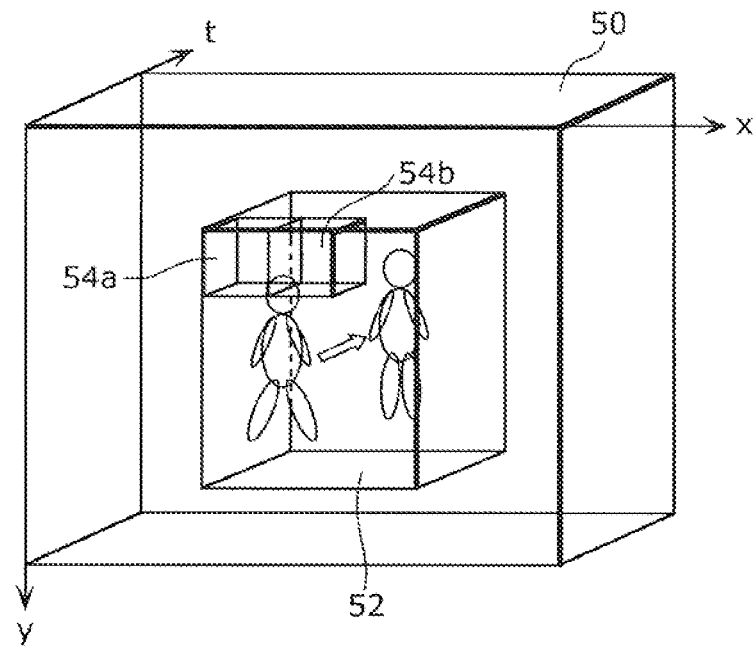
FIG. 12A is a diagram for explaining moving object detection processes performed by a moving object detection device according to Modification 3 of Embodiment 1.
Figure 12B:
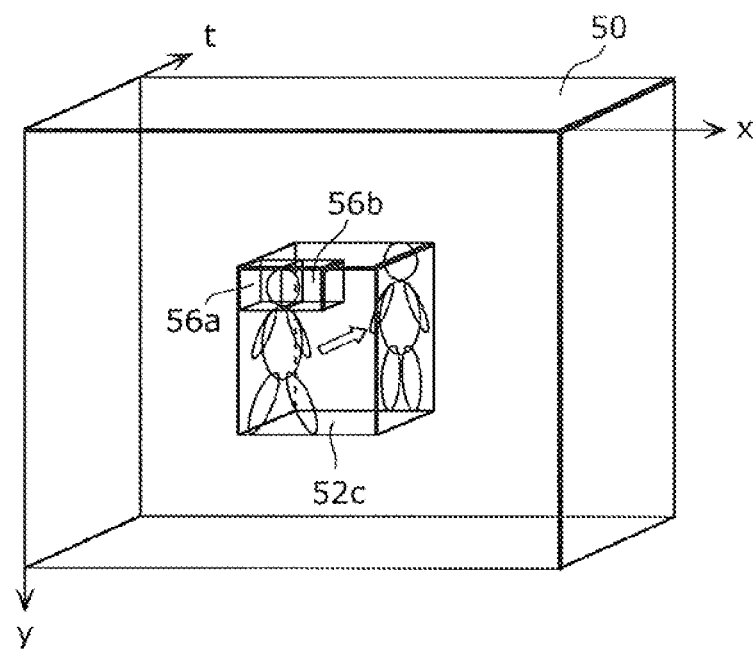
FIG. 12B is a diagram for explaining moving object detection processes performed by a moving object detection device according to Modification 3 of Embodiment 1.
Figure 12C:
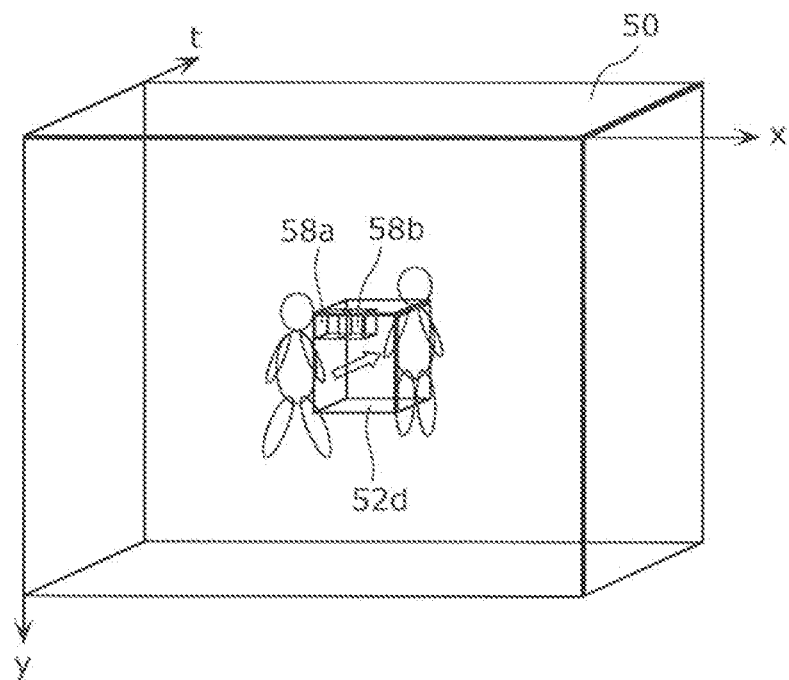
FIG. 12C is a diagram for explaining moving object detection processes performed by a moving object detection device according to Modification 3 of Embodiment 1.

For example, as shown in FIG. 12A, the moving object detection device 100 according to Modification 3 of Embodiment 1 detects a moving object by scanning the window 52 in the video 50. When the moving object is detected, the moving object detection device 100 ends the process. When the moving object is not detected, the moving object detection device 100 detects the moving object by scanning, in the video 50, a window 52c having a size that is smaller than the size of the window 54 as shown in FIG. 12B. When the moving object is detected, the moving object detection device 100 ends the process. When the moving object is not detected, the moving object detection device 100 detects the moving object by scanning, in the video 50, a window 52d having a size that is further smaller than the size of the window 52c as shown in FIG. 12C. It should be noted that the windows 52c and 52d have the same configurations as the reduced window 52a and 52b, respectively.

FIG. 13 is a flowchart showing processes performed by the moving object detection device 100.

The window setting unit 102 sets the window 52 within the video as shown in FIG. 12A (S2e).

The moving object detection device 100 determines whether or not the moving object is included within the window 52 by performing the processes of S4e to S12e. The processes of S4e to S12e are the same as the processes of S4 to S12 shown in FIG. 3.

The window setting unit 102 determines whether or not the window 52 has been set in all positions of the above described predetermined area within the video 50 (S14e). When the window 52 is not set in all the positions (NO in S14e), the window setting unit 102 sets the window 52 at the pending positions (S2e) and then the moving object detection device 100a performs the S4e and the following processes on the set window 52. It should be noted that a way to scan the window is the same as the way according to Embodiment 1.

When the window 52 has already been set in all the positions (YES in S14e) and the moving object is detected within the video (YES in S22a), the moving object detection device 100 ends the process.

When the window 52 has already been set in all the positions (YES in 514e) and the moving object is not detected within the video (NO in S22a), the moving object detection device 100 detects the moving object by scanning, in the video 50, the window 52c having a size that is smaller than the size of the window 52 shown in FIG. 12B (S2f to S14f).

The processes of S2f to S14f are the same as the processes S2e to S14e, except that the size of the window is smaller. Therefore, a detailed description will not be repeated.

As described above, since the moving object detection device according to Modification 3 of Embodiment 1 can detect the moving object using the windows of various sizes, the moving object detection device can detect the moving objects of various sizes.

Embodiment 2

Next, a moving object detection device according to Embodiment 2 will be described. In Embodiment 1, the moving object is detected based on the spatial histogram and the temporal histogram. In Embodiment 2, the moving object is detected further based on an optical flow histogram that is a histogram of an optical flow direction, as well as the spatial histogram and the temporal histogram.

Figure 14:
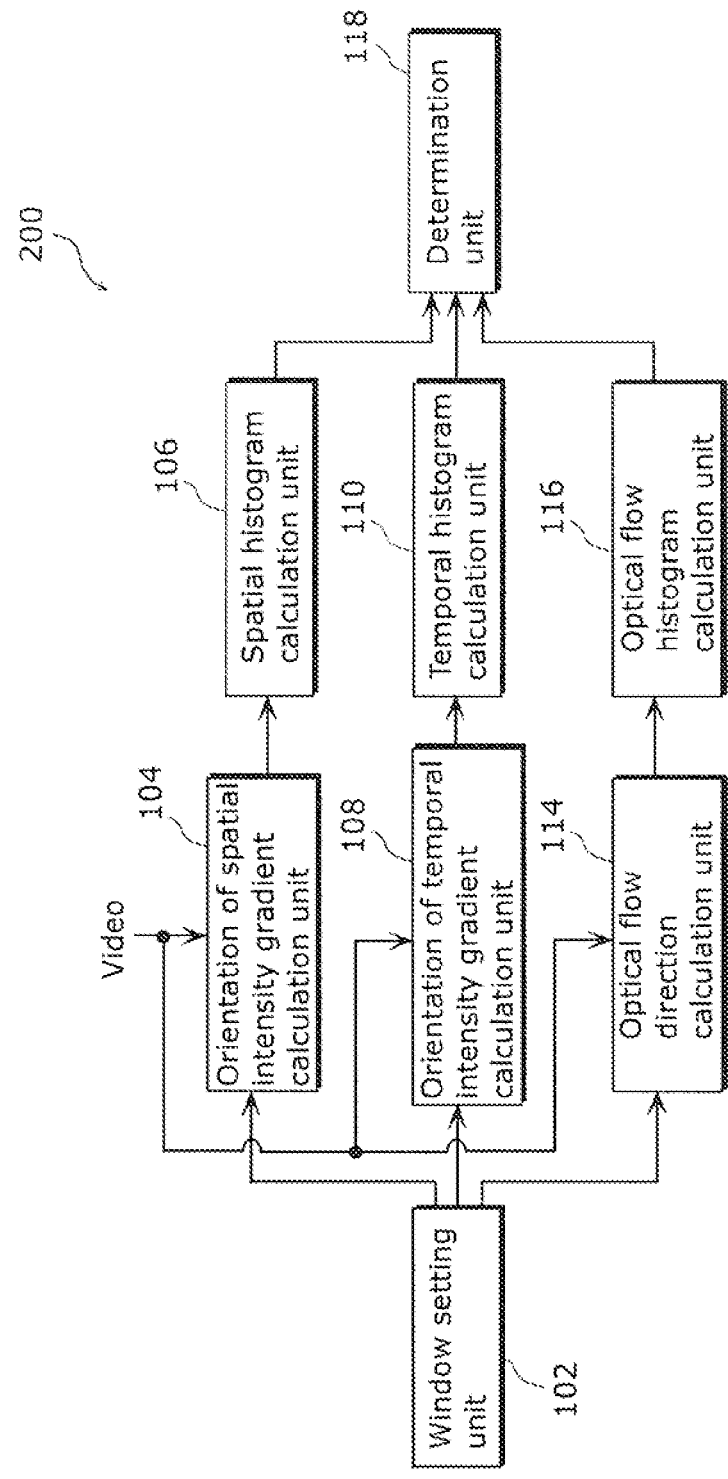
FIG. 14 is a block diagram showing a functional configuration of a moving object detection device according to Embodiment 2.

FIG. 14 is a block diagram showing a functional configuration of a moving object detection device according to Embodiment 2.

A moving object detection device 200 is a device for detecting a moving object from a video, including: a window setting unit 102; an orientation of spatial intensity gradient calculation unit 104; a spatial histogram calculation unit 106; an orientation of temporal intensity gradient calculation unit 108; a temporal histogram calculation unit 110, an optical flow direction calculation unit 114; an optical flow histogram calculation unit 116; and a determination unit 118.

The window setting unit 102, the orientation of spatial intensity gradient calculation unit 104, the spatial histogram calculation unit 106, the orientation of temporal intensity gradient calculation unit 108, and the temporal histogram calculation unit 110 have the same configuration as those shown in Embodiment 1. Therefore, a detailed description will not be repeated.

The optical flow direction calculation unit 114 calculates an optical flow direction for each of the pixels included in the window.

The optical flow histogram calculation unit 116 calculates an optical flow histogram that is a histogram of an optical flow direction within the window.

Figure 15:
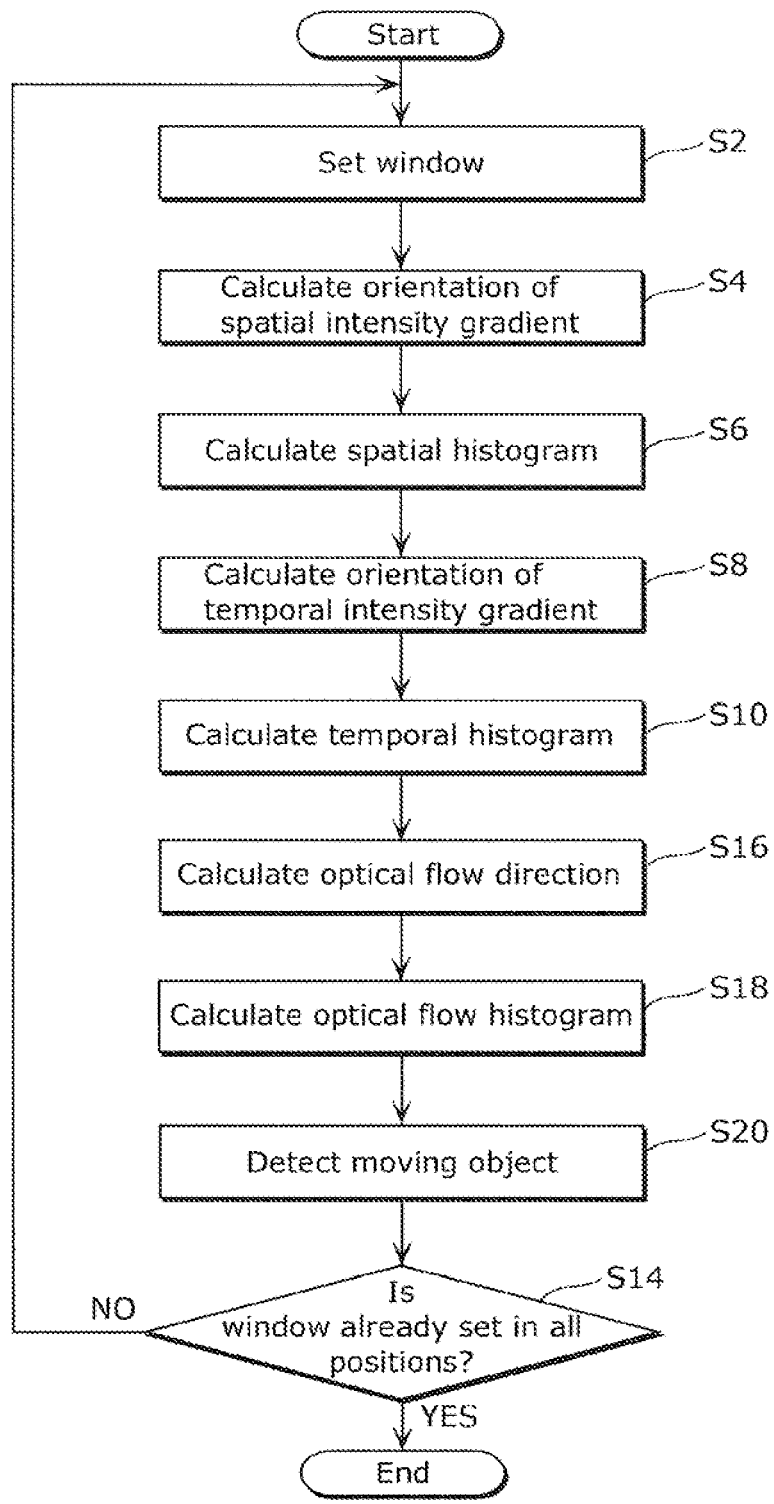
FIG. 15 is a flowchart showing processes performed by a moving object detection device according to Embodiment 2.

FIG. 15 is a flowchart showing processes performed by the moving object detection device 200.

The processes of S2 to S10 are the same as the processes of S2 to S10 in FIG. 3 shown in Embodiment 1. Therefore, a detailed description will not be repeated.

Figure 16:
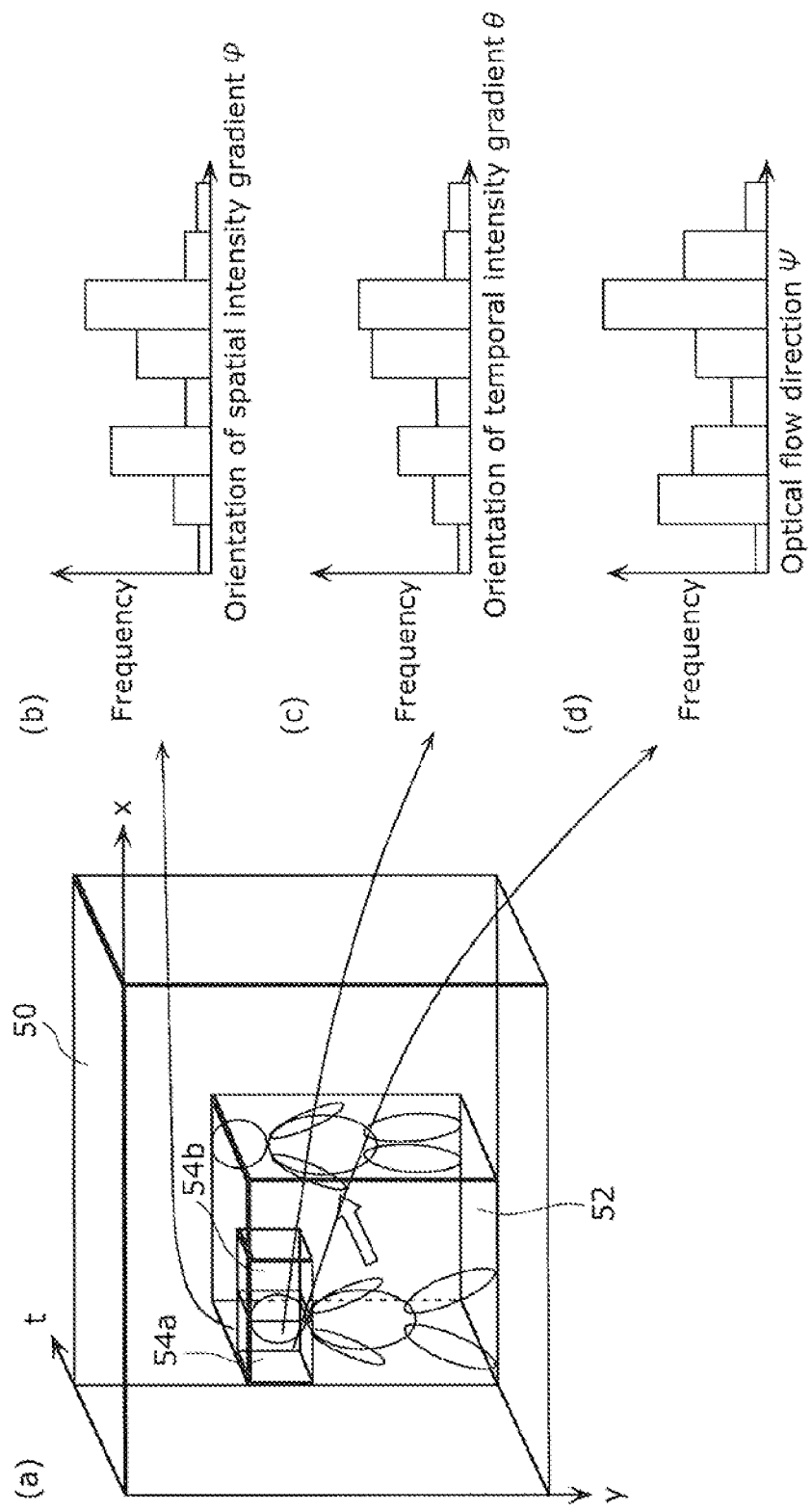
FIG. 16 is a diagram for explaining a feature calculated by a moving object detection device according to Embodiment 2.

With reference to the part (a) of FIG. 16, the optical flow direction calculation unit 114 calculates an optical flow direction for each of the pixels included in the window 52 (S16). With reference to the part (a) of FIG. 17, when intensity I for each of the pixels within the window 52 is I (x, y, t), the optical flow direction calculation unit 114 calculates the optical flow for each of the pixels $u=[u_x, u_y]$. Moreover, an optical flow direction $\psi$ for each of the pixels is calculated with the following expression (3).

$$\psi = \tan^{-1}(u_y/u_x) \quad (3)$$

It should be noted that the optical flow $u=[u_x, u_y]$ can be calculated using publicly known techniques such as a differential method, template matching method, and so on. Therefore, a detailed description will not be repeated.

Figure 17:
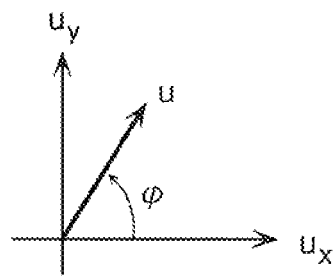
FIG. 17 is a diagram for explaining a feature calculated by a moving object detection device according to Embodiment 2.

A relationship between the optical flow u and the optical flow direction $\psi$ is shown as the part (b) of FIG. 17. In other words, an angle formed by a vector u on a two-dimensional plane with an x axis determined as $u_x$ and a y axis determined as $u_y$, and the x axis is the optical flow direction $\psi$.

The optical flow histogram calculation unit 116 generates, for each of the patches, an optical flow histogram that is the histogram of the optical flow direction $\psi$ within the patch (S18). For example, by quantizing the optical flow direction $\psi$ at a predetermined width (for example, quantized at the width of 30 degrees) and counting the frequency for each of the bins in the optical flow direction $\psi$, the optical flow histogram shown in the part (d) of FIG. 16 is calculated. The optical flow histogram calculation unit 116 calculates the optical flow histograms for the total number of patches. It should be noted that by the process of S6, the spatial histogram shown in the part (b) of FIG. 16 is calculated, and by the process of S10, the temporal histogram shown in the part (c) of FIG. 16 is calculated.

The determination unit 118 receives, as an input feature, the spatial histograms for the number of patches calculated by the spatial histogram calculation unit 106, the temporal histograms for the number of patches calculated by the temporal histogram calculation unit 110, and the optical flow histograms for the number of patches calculated by the optical flow histogram calculation unit 116, and then determines whether or not the moving object is included within the window 52 based on the input feature (S20). As a method for detecting (determining) a moving object, general techniques such as Adaboost, Support Vector Machine (SVM), and neural network can be used. Therefore, a detailed description will not be repeated.

The window setting unit 102 determines whether or not the window 52 has been set in all positions within the video 50 (S14). When the window 52 has been set in all the positions (YES in S14), the moving object detection device 200 ends the process. When the window 52 is not set in all the positions (NO in S14), the window setting unit 102 sets the window 52 in the pending positions (S2) and then the moving object detection device 200 performs the S4 and the following processes for the set window 52. It should be noted that a way to scan the window is the same as the way according to Embodiment 1.

As described above, by adding the moving object detection device according to Embodiment 1 and an optical flow histogram showing the feature of the direction of the moving object, the moving object detection device according to Embodiment 2 detects the moving object. With this, the moving object can be more reliably detected.

Embodiment 3

Next, a moving object detection device according to Embodiment 3 will be described. In Embodiment 2, the moving object is detected based on the spatial histogram, the temporal histogram, and the optical flow histogram. In Embodiment 3, a method for generating each of the histograms is different. In other words, the difference from Embodiment 2 is that a histogram to which variate co-occurrence is added is generated.

Next, a moving object detection device according to Embodiment 3 has the same configuration as the moving object detection device 200 according to Embodiment 2 shown in FIG. 14. It should be noted that the process performed by each of the processing units is different from the process performed by each of the processing units according to Embodiment 2. The following will describe a moving object detection device 200 according to Embodiment 3 by focusing on the difference from Embodiment 2.

The spatial histogram calculation unit 106 determines, as the first pair of variables, a combination of orientations of spatial intensity gradients of pixels having a predetermined positional relationship, and then calculates the histogram of the first pair of variables within the window.

The temporal histogram calculation unit 110 determines, as the second pair of variables, a combination of orientations of temporal intensity gradients of pixels having the predetermined positional relationship, and then calculates the histogram of the second pair of variables within the window.

The optical flow histogram calculation unit 116 determines, as the third pair of variables, a combination of optical flow directions of pixels having the predetermined positional relationship, and then calculates the histogram of the third pair of variables within the window.

The determination unit 118 determines whether or not the moving object is included within the window based on the histogram of the first pair of variables, the histogram of the second pair of variables, and the histogram of the third pair of variables.

A flow of the processes performed by the moving object detection device 200 is the same as the flow of the flowchart shown in FIG. 15. It should be noted that each of the processes is different. Hereafter, description will be made mainly on the differences.

The processes of S2 to S4 are the same as the processes in Embodiment 2.

Figure 18:
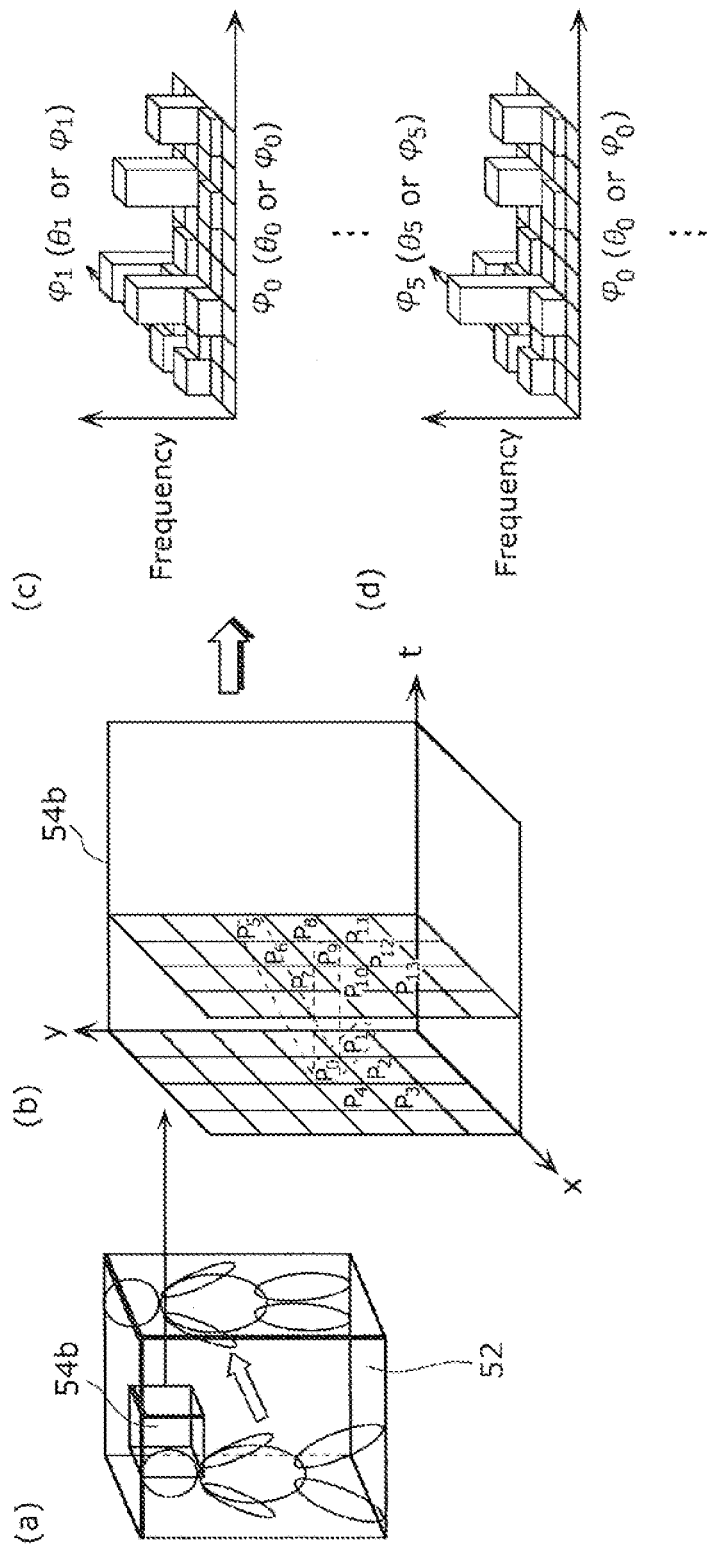
FIG. 18 is a diagram for explaining a feature calculated by a moving object detection device according to Embodiment 3.

The spatial histogram calculation unit 106 calculates the above described first pair of variables for each of the patches within the window (S6). With reference to FIG. 18, the process of S6 will be described in detail. The part (a) of FIG. 18 shows an example of a patch 54b set within the window 52. The part (b) of FIG. 18 is a diagram in which the patch 54b is expanded, and shows arrangement of pixels within the patch 54b at a point of time and arrangement of pixels at the next point of time. In other words, when attention is focused on pixel $P_0$ at a point of time, on the paper, the adjacent pixel on the diagonal bottom right of $P_0$, the adjacent pixel under the pixel $P_0$, the adjacent pixel on the diagonal bottom left, and the adjacent pixel to the left of the pixel $P_0$ are pixels for co-occurrence $P_1$, $P_2$, $P_3$, and $P_4$, respectively. Moreover, the pixel which is located at the next point of time and has the same x coordinate and y coordinate as the pixel $P_0$ is determined as $P_9$. Moreover, the eight pixels for co-occurrence adjacent around the pixel for co-occurrence $P_9$ are determined as $P_5$ to $P_8$ and $P_{10}$ to $P_{13}$. Moreover, the orientation of spatial intensity gradient of the pixel $P_0$ is determined as $\phi_0$, and the orientation of spatial intensity gradient of the pixel for co-occurrence $P_i$ (i=1 to 13) is determined as $\phi_i$ (i=1 to 13). When the pixel which pays attention to each of the pixels within the patch 54b is $P_0$, the spatial histogram calculation unit 106 generates a two-dimensional histogram which determines $\phi 0$ and $\phi i$ as the first pair of variables. The two-dimensional histogram is the histogram of the above described first pair of variables. The part (c) of FIG. 18 shows an example of the histogram in which $\psi_0$ and $\Phi_1$ are determined as the first pair of variables. The part (d) of FIG. 18 shows an example of the histogram in which $\phi_0$ and $\phi_5$ are determined as the first pair of variables. In the example shown in the part (b) of FIG. 18, since there are 13 combinations of the pixel $P_0$ and the pixel for co-occurrence $P_i$ (i=1 to 13), the 13 histograms of the first pairs of variables can be obtained from a single patch 54b. The spatial histogram calculation unit 106 calculates the 13 histograms of the first pairs of variables for all the patches within the window 52.

The processes of S8 is the same as the process in Embodiment 2.

The temporal histogram calculation unit 110 calculates the histogram of the above described second pair of variables for each of the patches within the window (S10). The method for calculating the histogram of the second pair of variables is the same as the method for calculating the histogram of the first pair of variables shown in FIG. 18, except that the orientation of spatial intensity gradient is replaced with the orientation of temporal intensity gradient. Therefore, a detailed description will not be repeated. With the process of S10, as similarly to the histograms of the first pairs of variables, the 13 histograms of the second pairs of variables can be obtained from a single patch 54b. The spatial histogram calculation unit 106 calculates the 13 histograms of the second pairs of variables for all the patches within the window 52.

The process of S16 is the same as the process in Embodiment 2.

The optical flow histogram calculation unit 116 calculates the histogram of the above described third pair of variables for each of the patches within the window (S18). The method for calculating the histogram of the third pair of variables is the same as the method for calculating the histogram of the first pair of variables shown in FIG. 18, except that the orientation of spatial intensity gradient is replaced with the optical flow direction. Therefore, a detailed description will not be repeated. With the process of S18, as similarly to the histograms of the first pairs of variables, the 13 histograms of the third pairs of variables can be obtained from a single patch 54b. The spatial histogram calculation unit 106 calculates the 13 histograms of the third pairs of variables for all the patches within the window 52.

The determination unit 118 receives, as an input feature, the number of patches x the 13 histograms of the first pairs of variables calculated by the spatial histogram calculation unit 106, the number of patches x the 13 histograms of the second pairs of variables calculated by the temporal histogram calculation unit 110, and the number of patches x the 13 histograms of the third pairs of variables calculated by the optical flow histogram calculation unit 116, and then determines whether or not the moving object is included within the window 52, based on the input feature (S20). As a method for detecting (determining) a moving object, general techniques such as Adaboost, Support Vector Machine (SVM), and neural network can be used. Therefore, a detailed description will not be repeated.

The window setting unit 102 determines whether or not the window 52 has been set in all positions within the video 50 (S14). When the window 52 has already been set in all the positions (YES in S14), the moving object detection device 200 ends the process. When the window 52 is not set in all the positions (NO in S14), the window setting unit 102 sets the window 52 in the pending positions (S2) and then the moving object detection device 200 performs the S4 and the following processes on the set window 52. It should be noted that a way to scan the window is the same as the way according to Embodiment 1.

As described above, the moving object detection device according to Embodiment 3 generates the histogram of the first pair of variables showing the co-occurrence of the orientation of spatial intensity gradient within the window, the histogram of the second pair of variables showing the co-occurrence of the orientation of temporal intensity gradient, and the histogram of the third pair of variables showing the co-occurrence of the optical flow direction, and then moving object detection is performed based on the three kinds of histograms, and then detects the moving object based on the three kinds of histograms. In this way, by using the histogram showing the co-occurrence within the time and space of the same feature, the moving object can be reliably detected.

Experiment Result

An experiment is conducted to compare the conventional technique and the methods for detecting a moving object that is performed by the moving object detection device as shown in the above described embodiments. It should be noted that Adaboost is used as the detection method in the determination unit of the moving object detection device. Moreover, the Lucas-Kanade method is used for the calculation of an optical flow, and OpenCV which is disclosed is used as the code.

Figure 19:
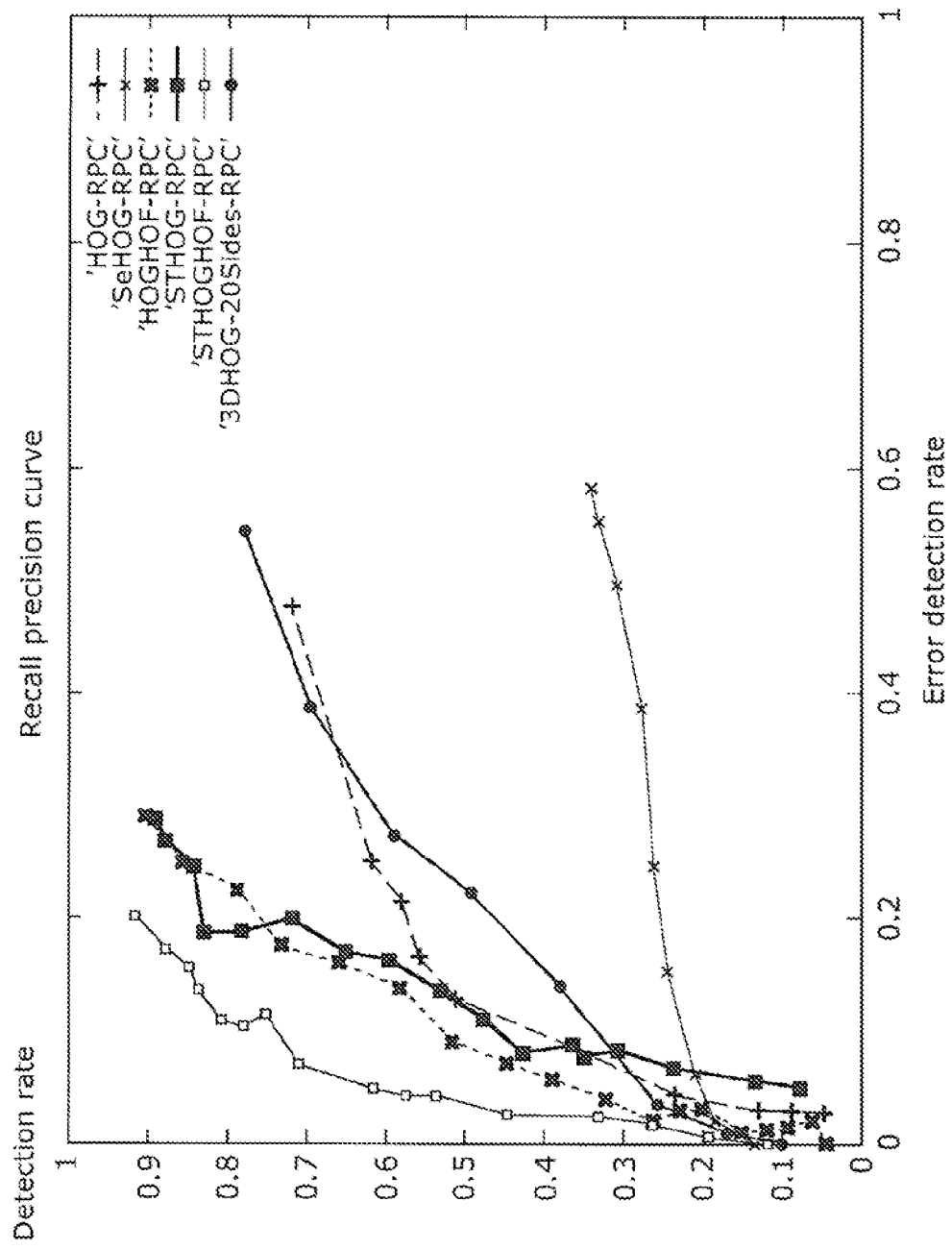
FIG. 19 is a graph showing a Recall-precision curve (RPC) of a detection method using various features with respect to a video captured on a rainy day.

FIG. 19 is a graph showing a Recall-precision curve (RPC) of a detection method using various features with respect to the video captured on a rainy day. A detail of RPC is disclosed in Non-Patent Literature 6.

[NPL6]

S. Agawal and D. Roth, "Learning a Sparse Representation for Object Detection", ECCV, 2002

In the graph of FIG. 19, the horizontal axis shows the error detection rate of the moving object, and the vertical axis is the detection rate of the moving object. In other words, when the error detection rate is near zero and the detection rate is near one (that is, RPC is closer to the left top of the graph), the performance is high. In FIG. 19, HOG-RPC is an RPC obtained by a technique using the HOG feature, SeHOG-RPC is an RPC obtained by a technique using the SeHOG feature (feature in which HOG features are arranged for a plurality of frames), and HOGHOF-RPC is an RPC obtained by a technique using the HOGHOF feature. Moreover, STHOG-RPC is an RPC obtained by a technique using the feature described in Embodiment 1 (hereafter referred to as the STHOG feature). Furthermore, STHOGHOF-RPC is an RPC obtained by a technique using the feature described in Embodiment 2 (hereafter referred to as the STHOGHOF feature). 3DHOG-20Sides-RPC is an RPC obtained by a technique using 3DHOG feature. When the RPCs are compared, it is found that the STHOGHOF-RPC is the closest to the left top corner of the graph and therefore the technique using the STHOG-HOF feature generates the highest performance. This is followed by the technique using the STHOG feature and the technique using the HOGHOF feature.

Figure 20:
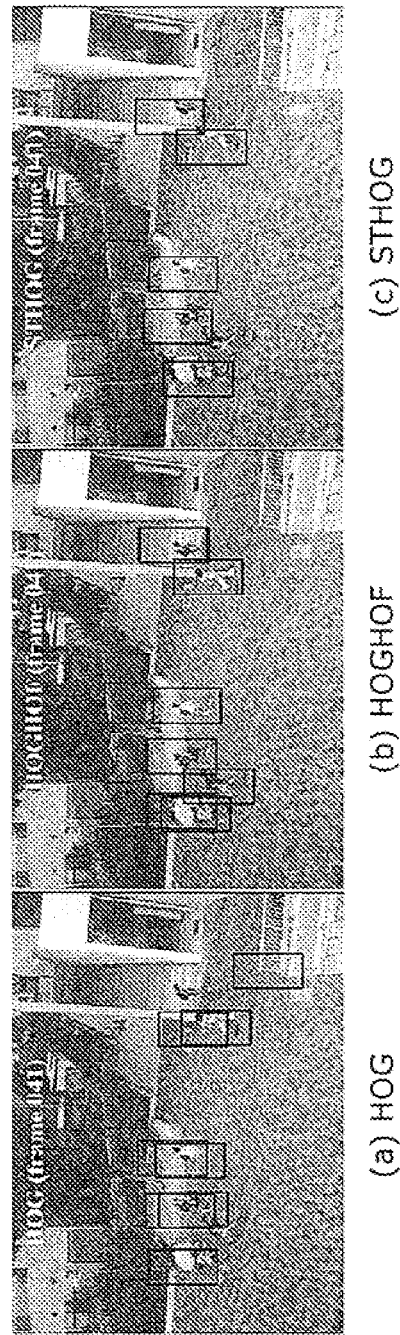
FIG. 20 is a diagram for comparing detection results of pedestrians with respect to the video captured on a rainy day.
Figure 21:
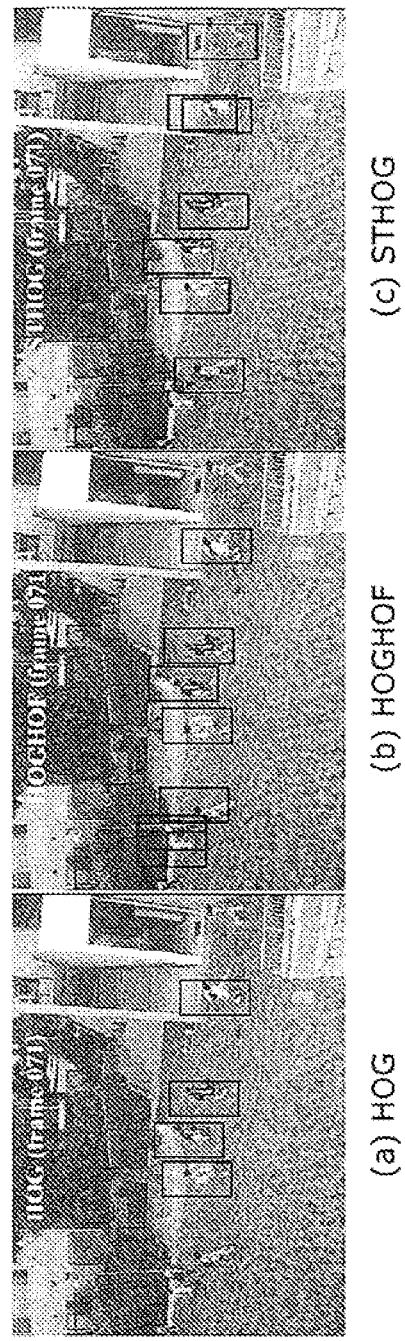
FIG. 21 is a diagram for comparing detection results of pedestrians with respect to the video captured on a rainy day.
Figure 22:
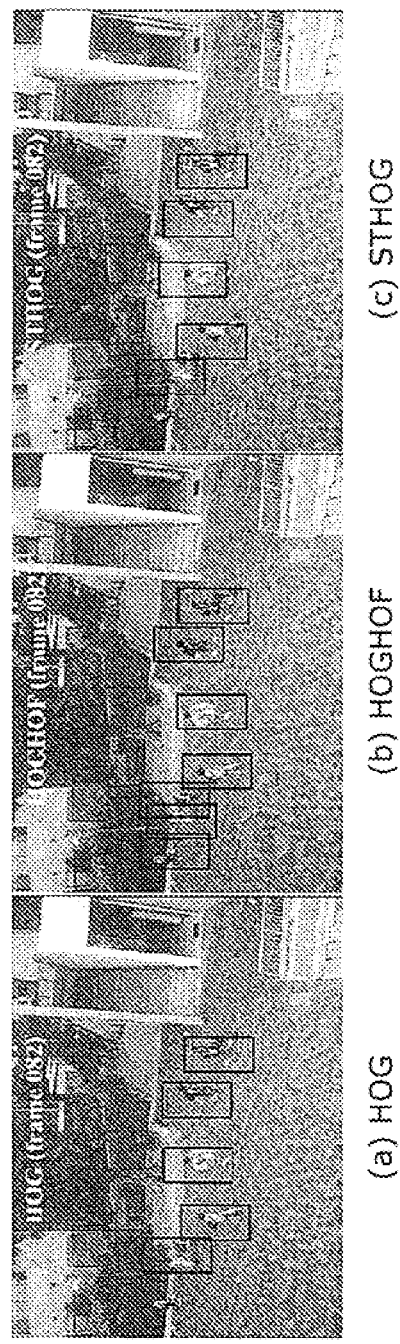
FIG. 22 is a diagram for comparing detection results of pedestrians with respect to the video captured on a rainy day.
Figure 23:
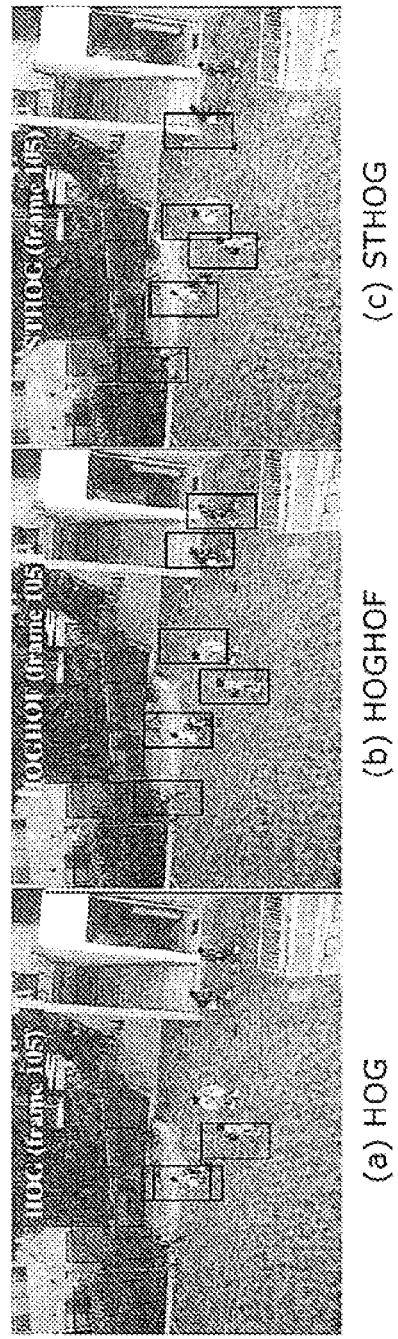
FIG. 23 is a diagram for comparing detection results of pedestrians with respect to the video captured on a rainy day.

FIG. 20 is a diagram for comparing detection results of pedestrians with respect to the video captured on a rainy day. The part (a) of FIG. 20 shows an example of the detection result of pedestrians using the HOG feature. The part (b) of FIG. 20 shows an example of the detection result of pedestrians using the HOGHOF feature. The part (c) of FIG. 20 shows an example of the detection results of pedestrians using the STHOG feature. Each of the detection results shows an image for the same point of time, and the regions detected as pedestrians are indicated by rectangles. FIGS. 21 to 23 show the detection results of images captured at a point of time different from that shown in FIG. 20. When the detection results are compared, it is found that there is a case where the background is detected by mistake as a pedestrian as shown in the rectangle on the lower right in the part (a) of FIG. 20 when the HOG feature is used, and there is a case where the pedestrian cannot be detected as shown in the part (a) of FIG. 21 or the part (a) of FIG. 23 when the HOG feature is used. In contrast, when the HOGHOF feature and the STHOG feature are used, it is found that the pedestrians can be reliably detected.

Figure 24:
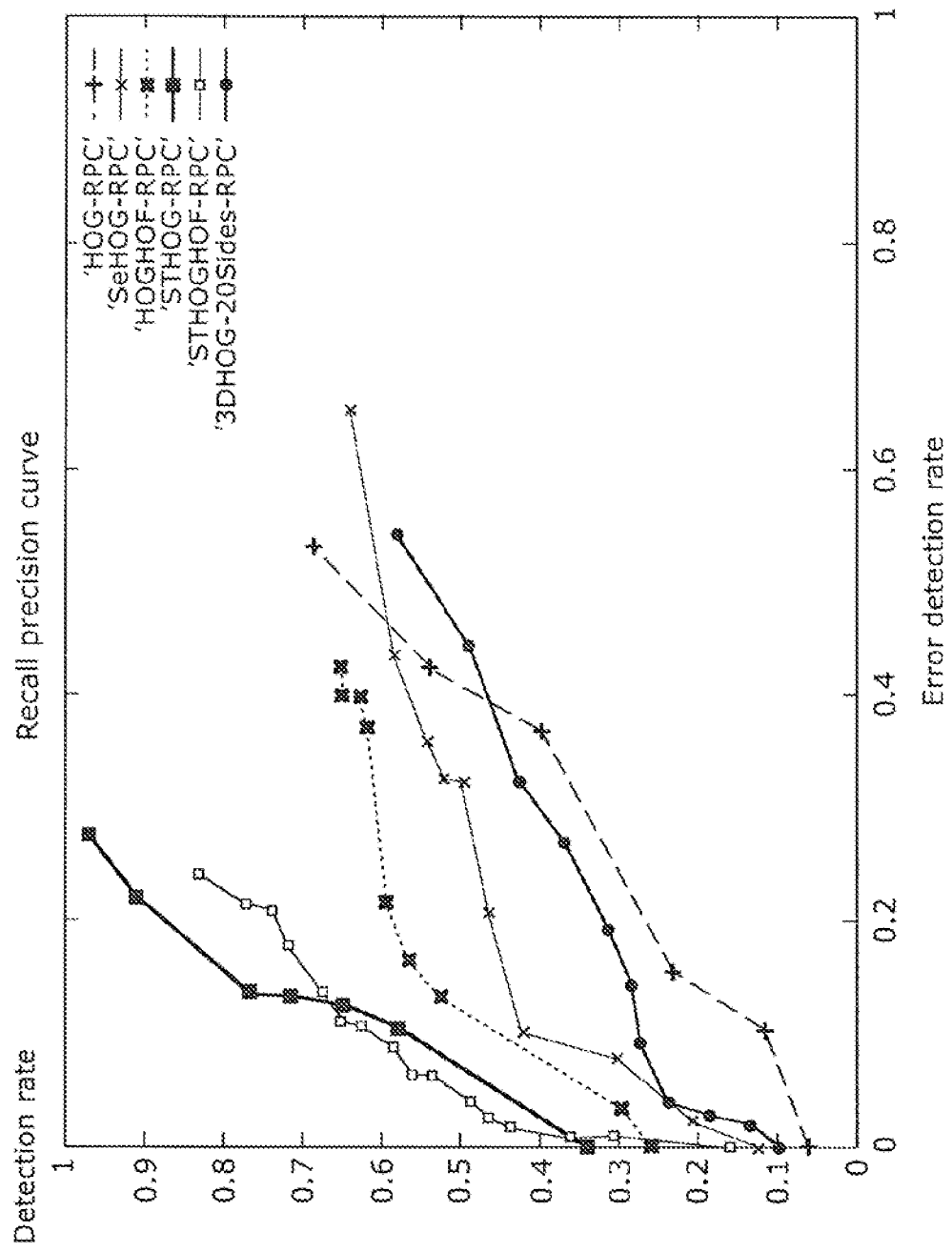
FIG. 24 is a graph showing a Recall-precision curve (RPC) of a detection method using various features with respect to a video captured on a fine day.

FIG. 24 is a graph showing an RPC of a detection method using various features with respect to the videos captured on a fine day. A way to look at the graph in FIG. 24 is the same as the way to look at the graph in FIG. 19. When the RPCs are compared, it is found that STHOG-RPC and STHOGHOF-RPC are the closest to the left top corner of the graph. This represents that the techniques using the STHOG feature and the STHOGHOF feature both score the highest performance, followed by the technique using the HOGHOF feature. The performance of the technique using the HOGHOF feature with respect to the video captured on a fine day is lower than the performance of the technique using the HOGHOF feature with respect to the video captured on a rainy day, because of the influence of shadow.

Figure 25:
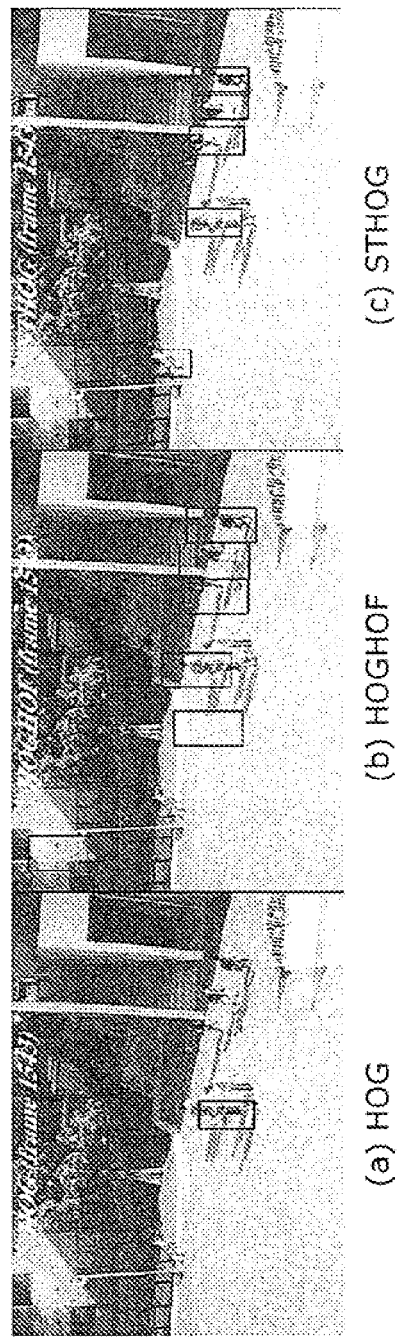
FIG. 25 is a diagram for comparing detection results of pedestrians with respect to the video captured on a fine day.
Figure 26:
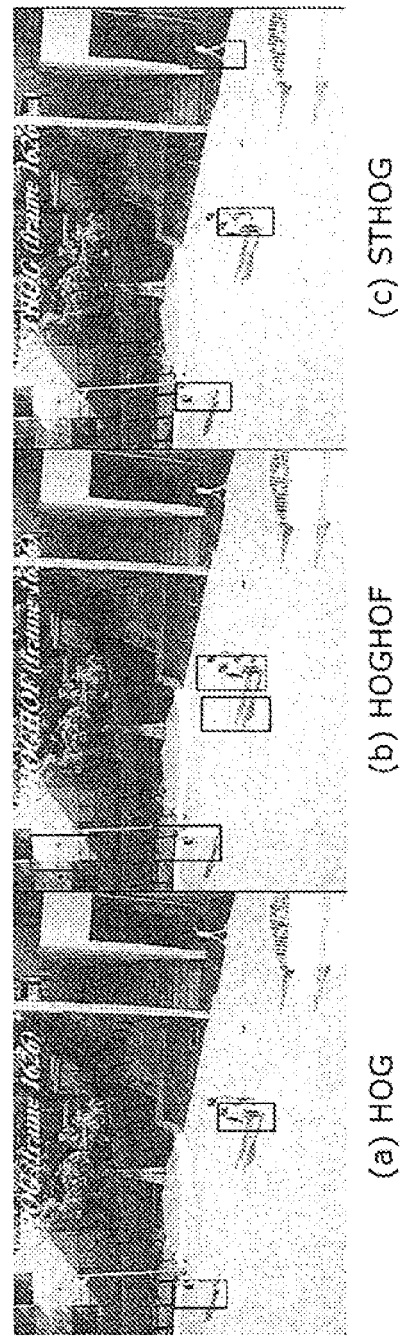
FIG. 26 is a diagram for comparing detection results of pedestrians with respect to a video captured on a fine day.
Figure 27:
FIG. 27 is a diagram for comparing detection results of pedestrians with respect to a video captured on a fine day.
Figure 28:
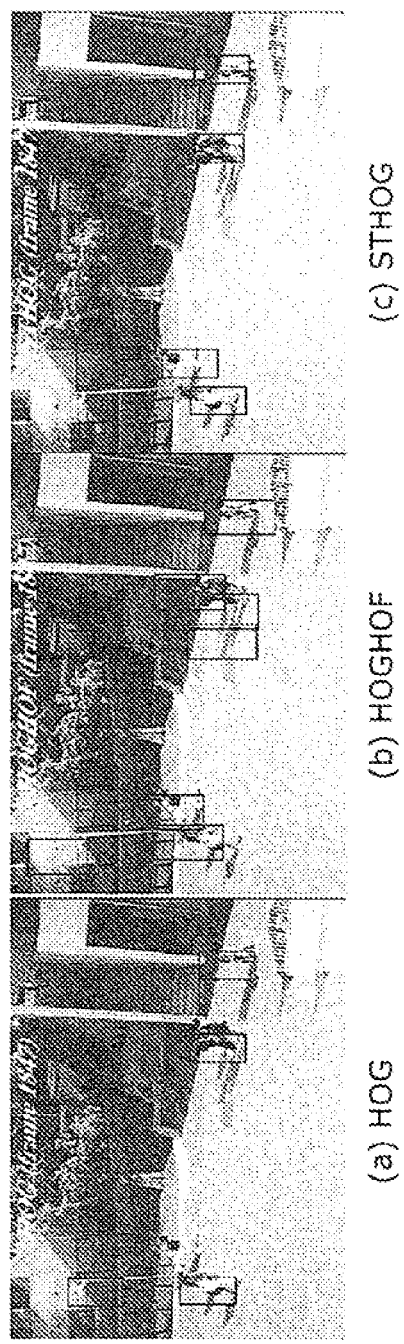
FIG. 28 is a diagram for comparing detection results of pedestrians with respect to a video captured on a fine day.

FIG. 25 is a diagram for comparing detection results of pedestrians with respect to a video captured on a fine day. The part (a) of FIG. 25 shows an example of the detection result of pedestrians using the HOG feature. The part (b) of FIG. 25 shows an example of the detection result of pedestrians using the HOGHOF feature. The part (c) of FIG. 25 shows an example of the detection result of pedestrians using the STHOG feature. Each of the detection results shows the image for the same point of time, and the regions detected as pedestrians are indicated by rectangles. FIGS. 26 to 28 show the detection results of the images captured at a point of time different from the point of time shown in FIG. 25. When the detection results are compared, it is found that there is a case where the pedestrians cannot be detected as shown in the part (a) of FIG. 25 or the part (a) of FIG. 26 when the HOG feature is used, and there is a case where the background is detected by mistake as a pedestrian as shown in a rectangle on the upper left of the part (a) of FIG. 28 when the HOG feature is used. Moreover, when the HOGHOF feature is used, there is a case where the shadow of the pedestrian is detected by mistake as a pedestrian. In contrast, when the STHOG feature is used, it is found that the pedestrian can be reliably detected without the detection of, by mistake, the shadow of the pedestrian and the other background as a pedestrian.

From the experiment data shown above, it can be proved that the detection of the moving object using the STHOG feature and STHOGHOF feature is superior to that using other features.

Figure 29:
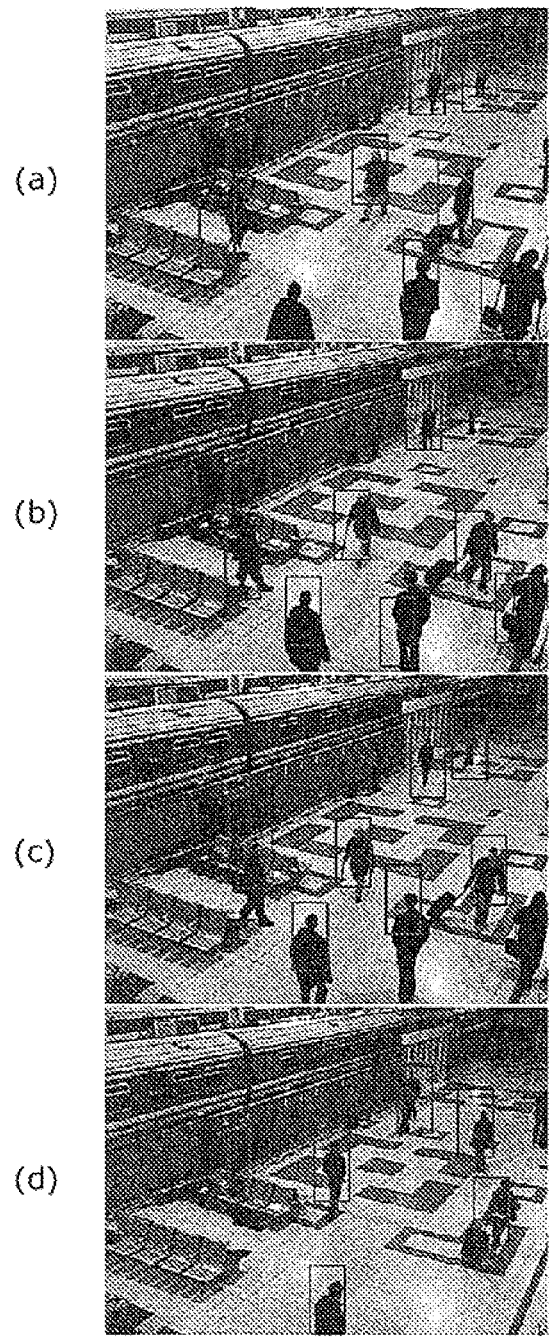
FIG. 29 is a diagram showing detection results of pedestrians using an STHOG feature that is a feature shown in Embodiment 1.
Figure 31:
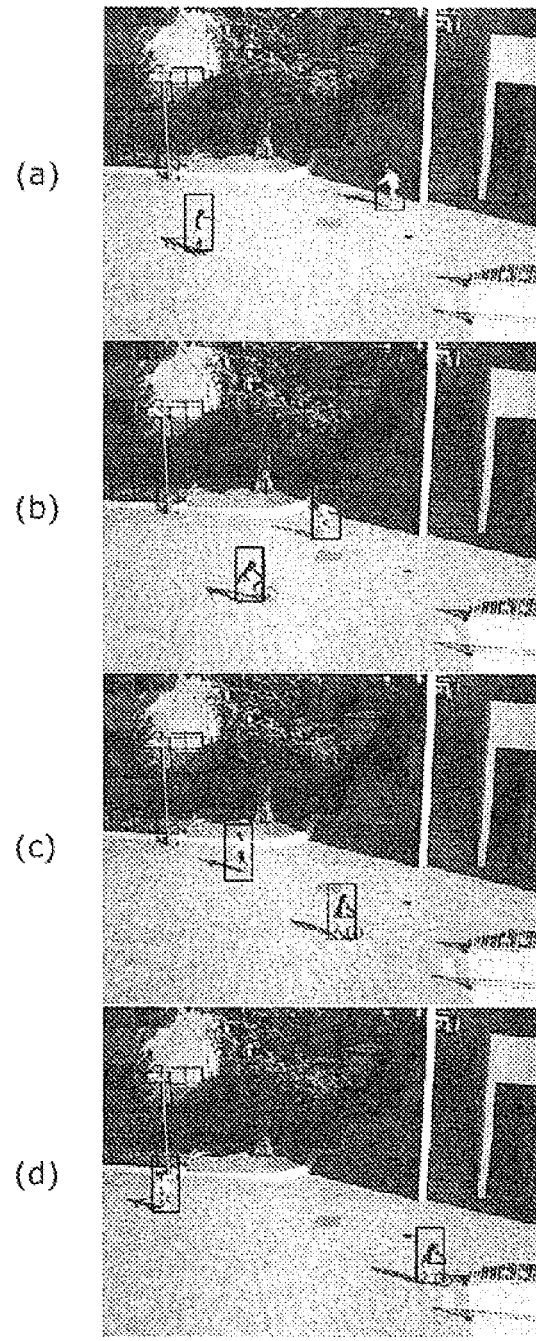
FIG. 31 is a diagram showing detection results of a person riding a unicycle, using an STHOG feature that is a feature shown in Embodiment 1.

It should be noted that FIGS. 29 and 30 show the results from the detection of pedestrians using the STHOG feature from videos in other scenes. It is found that pedestrians can be reliably detected. Moreover, FIG. 31 shows the detection results of people riding a unicycle, using the STHOG feature. It is found that the people can be reliably detected even when they ride a unicycle.

The moving object detection device according to the embodiments of the present invention has been described. However, the present invention is not limited to the present embodiments.

For example, in above described Embodiment 3, the description is made by determining the combination of orientations of spatial intensity gradients of two pixels as the first pair of variables. However, the number of pixels is not limited to two, and it is acceptable to determine a combination of orientations of spatial intensity gradients of three or more pixels as the first pair of variables. Similarly, a combination of orientations of temporal intensity gradients of three or more pixels may be determined as the second pair of variables, and a combination of optical flow directions of three or more pixels may be determined as the third pair of variables.

Moreover, in Embodiment 3, the moving object is detected using the histogram of the first pair of variables, the histogram of the second pair of variables, and the histogram of the third pair of variables. However, the moving object may be detected using only the histogram of the first pair of variables and the histogram of the second pair of variables. In this case, the moving object can be detected by the moving object detection device having the same configuration as the moving object detection device 100 shown in FIG. 1.

Moreover, the detection process of the moving object based on the image pyramid as shown in Modification 1 or 2 of Embodiment 1 or the detection process of the moving object based on windows of sizes as shown in Modification 3 of Embodiment 1 may be applied to Embodiment 2 or Embodiment 3. It should be noted that the number of layers in the image pyramid is not limited to two. The number of layers may be three or more. In other words, by preparing reduced videos having different reduction ratios, the detection process of the moving object may be performed.

Moreover, the shapes of the window and the patch are not limited to a rectangular parallelepiped. Other shapes are also acceptable. For example, a sphere is acceptable.

Moreover, in above described Embodiments 1 to 3, the size of the window 52 does not have to be limited to one kind. Instead, by providing the windows 52 having a plurality of sizes, the detection of the moving object may be performed for each of the windows 52 having different sizes. In other words, with reference to the example of Embodiment 1, the window setting unit 102 sets, in the video 50, a plurality of the windows 52 having different volumes. Moreover, the spatial histogram calculation unit 106 calculates a spatial histogram for each of the windows 52. Furthermore, the temporal histogram calculation unit 110 calculates a temporal histogram for each of the windows 52. Moreover, the determination unit 118 determines, for each of the windows 52, whether or not the moving object is included within the window 52 based on the spatial histogram and the temporal histogram. By providing the windows 52 having different sizes, the moving objects of various sizes can be detected.

Moreover, in Embodiment 3, the pixel for co-occurrence $P_i$ is not limited to the adjacent pixel of the target pixel $P_0$. Any pixel is acceptable as long as it is a pixel having a predetermined positional relationship with the pixel $P_0$. Moreover, the total number of pixels for co-occurrence $P_i$ is not limited to 13, and the total number can be selected where appropriate. For example, the total number may be one.

Moreover, in above described Embodiments 1 to 3, the orientation of spatial intensity gradient and the orientation of temporal intensity gradient are calculated every time the window is set. However, an overlap of the window occurs before and after the shift of the position of the window. Therefore, the spatial histogram and the temporal histogram may be calculated without the calculation again of the orientation of spatial intensity gradient and the orientation of temporal intensity gradient for the overlapped part, using the already calculated orientation of spatial intensity gradient and the already calculated orientation of temporal intensity gradient.

Moreover, each of the above described devices is a computer system including a microprocessor, ROM, RAM, a hard disk drive, a display unit, a keyboard, a mouse, and so on. A computer program is stored in the RAM or the hard disk drive. The respective devices achieve their functions through the microprocessor's operation according to the computer program. Here, the computer program is configured by combining plural instruction codes indicating instructions for the computer.

A part or all of the constituent elements constituting the respective devices may be configured from a single System Large Scale Integration (LSI). The System LSI is a super-multi-function LSI manufactured by integrating constituent units on one chip, and is specially a computer system configured by including a microprocessor, a ROM, a RAM, and so on. A computer program is stored in the RAM. The System LSI achieves its function through the microprocessor's operation according to the computer program.

Furthermore, a part of all of the constituent elements constituting the respective devices may be configured as an IC card or as a stand-alone module which can be attached or detached from the respective devices. The IC card or the module is a computer system configured from a microprocessor, a ROM, a RAM, and so on. The IC card or the module may also be Included in the aforementioned super-multi-function LSI. The IC card of the module achieves its function through the microprocessor's operation according to the computer program. The IC card or the module may also be implemented to be tamper-resistant.

Moreover, the present invention may be the above described methods. The present invention may be a computer program for realizing the previously illustrated methods, using the computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc (registered trademark)), and a semiconductor memory. Furthermore, the present invention may be the digital signal recorded in these recording media.

Furthermore, the present invention may also be realized by the transmission of the aforementioned computer program of digital signal via a telecommunication line, a wireless or wired communication line, a network represented by the Internet, a data broadcast, and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recoding media, or by transferring the program of the digital signal via the aforementioned network and the like, execution using another independent computer system is also made possible.

Furthermore, a combination of each of the above described embodiments and a corresponding one of the above described modifications is acceptable.

The disclosed embodiments are exemplary and are not limited from all points of views. The scope of the present invention is defined by the claims instead of by the above description, and is intended to include the equivalent meaning of the claims and all the modifications within the scope.

INDUSTRIAL APPLICABILITY

The present invention can be applied to a monitoring device, a pedestrian detection device for a vehicle, an intelligence robot, or the like.

REFERENCE SIGNS LIST

10 Input image
12, 52 Window
14a, 14b, 54a, 54b, 56a Patch
40 Two-dimensional image
50 Video
50a, 50b Reduced video
52a, 52b Reduced window
55 Vector
100, 100a, 200 Moving object detection device
102 Window setting unit
103 Reduced video generation unit
104 Orientation of spatial intensity gradient calculation unit
105 Reduced window setting unit
106 Spatial histogram calculation unit
108 Orientation of temporal intensity gradient calculation unit
110 Temporal histogram calculation unit 112, 118 Determination unit
114 Optical flow direction calculation unit
116 Optical flow histogram calculation unit

The invention claimed is:

1. A moving object detection device which detects a moving object from a video, the moving object detection device comprising:
   a window setting unit configured to set a window having a predetermined volume in the video that is a three-dimensional image in which two-dimensional images are arranged in a temporal axis direction;
   an orientation of spatial intensity gradient calculation unit configured to calculate, for each pixel included in the window, an orientation of spatial intensity gradient that is an orientation of spatial gradient of intensity;
   a spatial histogram calculation unit configured to calculate a spatial histogram that is a histogram of the orientation of spatial intensity gradient within the window;
   an orientation of temporal intensity gradient calculation unit configured to calculate, for each pixel included in the window, an orientation of temporal intensity gradient that is an orientation of temporal gradient of intensity;
   a temporal histogram calculation unit configured to calculate a temporal histogram that is a histogram of the orientation of temporal intensity gradient within the window; and
   a determination unit configured to determine whether or not the moving object is included within the window, based on the spatial histogram calculated by the spatial histogram calculation unit and the temporal histogram calculated by the temporal histogram calculation unit.

2. The moving object detection device according to claim 1, further comprising:
   an optical flow direction calculation unit configured to calculate an optical flow direction for each pixel included in the window; and
   an optical flow histogram calculation unit configured to calculate an optical flow histogram that is a histogram of the optical flow direction within the window,
   wherein the determination unit is configured to determine whether or not the moving object is included within the window, based on the spatial histogram calculated by the spatial histogram calculation unit, the temporal histogram calculated by the temporal histogram calculation unit, and the optical flow histogram calculated by the optical flow histogram calculation unit.

3. The moving object detection device according to claim 2,
   wherein the spatial histogram calculation unit is configured to determine, as a first pair of variables, a combination of orientations of spatial intensity gradients including the orientation of spatial intensity gradient of pixels mutually having a predetermined positional relationship, and to calculate a histogram of the first pair of variables within the window,
   the temporal histogram calculation unit is configured to determine, as a second pair of variables, a combination of orientations of temporal intensity gradients including the orientation of temporal intensity gradient of the pixels mutually having the predetermined positional relationship, and to calculate a histogram of the second pair of variables within the window,
   the optical flow histogram calculation unit is configured to determine, as a third pair of variables, a combination of optical flow directions including the optical flow direction of the pixels mutually having the predetermined positional relationship, and to calculate a histogram of the third pair of variables within the window, and
   the determination unit is configured to determine whether or not the moving object is included within the window, based on the histogram of the first pair of variables, the histogram of the second pair of variables, and the histogram of the third pair of variables.

4. The moving object detection device according to claim 1,
   wherein the spatial histogram calculation unit is configured to determine, as a first pair of variables, a combination of orientations of spatial intensity gradients including the orientation of spatial intensity gradient of pixels mutually having a predetermined positional relationship, and to calculate a histogram of the first pair of variables within the window,
   the temporal histogram calculation unit is configured to determine, as a second pair of variables, a combination of orientations of temporal intensity gradients including the orientation of temporal intensity gradient of the pixels mutually having the predetermined positional relationship, and to calculate a histogram of the second pair of variables within the window, and
   the determination unit is configured to determine whether or not the moving object is included within the window, based on the histogram of the first pair of variables and the histogram of the second pair of variables.

5. The moving object detection device according to claim 1,
   wherein the orientation of spatial intensity gradient calculation unit is configured to calculate, for each pixel included within the window, the orientation of spatial intensity gradient as $\phi$ shown in a following expression (1), when a gradient of an intensity in an x-axis direction of the pixel is determined as $I_x$ and a gradient of the intensity in a y-axis direction is determined as $I_y$.

$$\phi = \tan^{-1}(I_y/I_x) \qquad (1)$$

6. The moving object detection device according to claim 1,
   wherein the orientation of temporal intensity gradient calculation unit is configured to calculate, for each pixel included within the window, the orientation of temporal intensity gradient as $\theta$ shown in a following expression (2), when a gradient of an intensity in an x-axis direction of the pixel is determined as $I_x$ and a gradient of the intensity in a y-axis direction is $I_y$, and a gradient of the intensity in the temporal axis direction is determined as $I_t$.

[Math. 1]

$$\theta = \tan^{-1}(I_t/\sqrt{I_x^2 + I_y^2}) \qquad (2)$$

7. The moving object detection device according to claim 1, further comprising:
   a reduced video generation unit configured to generate reduced videos each of which is obtained by reducing the video with one of a plurality of predetermined reduction ratios;
   a reduced window setting unit configured to set, for each of the reduced videos, a reduced window in the reduced video, to set reduced windows in the reduced videos, the reduced window being obtained by reducing the window with a reduction ratio used in generating the reduced video,
   the orientation of spatial intensity gradient calculation unit is further configured to calculate, for each of the reduced windows, an orientation of spatial intensity gradient for each pixel included in the reduced window, the spatial histogram calculation unit is further configured to calculate, for each of the reduced windows, a reduced spatial histogram within the reduced window, the orientation of temporal intensity gradient calculation unit is further configured to calculate, for each of the reduced windows, an orientation of temporal intensity gradient for each pixel included in the reduced window, the temporal histogram calculation unit is further configured to calculate, for each of the reduced windows, a reduced temporal histogram within the reduced window, the reduced window setting unit is configured to select each of the reduction ratios as a target reduction ratio in an ascending order starting from a smallest reduction ratio from among the plurality of reduction ratios, and to set the reduced window with the target reduction ratio in the reduced video with the target reduction ratio, the determination unit is configured to determine whether or not the moving object is included in the reduced window with the target reduction ratio, based on the reduced spatial histogram and the reduced temporal histogram with the reduced reduction ratio, the window setting unit is configured to sequentially set the window, in positions within a predetermined area, from a position in the video corresponding to a setting position of the reduced window in the reduced video with the target reduction ratio, when the determination unit determines that the moving object is included in the reduced window, and the determination unit is further configured to determine whether or not the moving object is included within the window set by the window setting unit, when the determination unit determines that the moving object is included in the reduced window.

8. The moving object detection device according to claim 1, further comprising a reduced video generation unit configured to generate reduced videos each of which is obtained by reducing the video with one of a plurality of predetermined reduction ratios, wherein the window setting unit is further configured to set the window in each of the reduced videos, the orientation of spatial intensity gradient calculation unit is further configured to calculate, for each of the reduced videos, an orientation of spatial intensity gradient for each pixel included in the window set in the reduced video, the spatial histogram calculation unit is further configured to calculate, for each of the reduced videos, a reduced spatial histogram within the window set in the reduced video, the orientation of temporal intensity gradient calculation unit is further configured to calculate, for each of the reduced videos, an orientation of temporal intensity gradient for each pixel included in the window set in the reduced video, the temporal histogram calculation unit is further configured to calculate, for each of the reduced videos, a reduced temporal histogram within the window set in the reduced video, and the determination unit is configured to: (a) sequentially select each of the reduction ratios as a target reduction ratio in an ascending order starting from a smallest reduction ratio from among the plurality of reduction ratios until it is determined that the moving object is included within the window, and determine whether or not the moving object is included in the window, based on the reduced spatial histogram and the reduced temporal histogram within the window that is set in the reduced video reduced with the target reduction ratio; and (b) determine whether or not the moving object is included within the window set in the video, based on the spatial histogram and the temporal histogram, when it is determined that the moving object is not included within the window in any of the reduced videos.

9. The moving object detection device according to claim 1, wherein the window setting unit is configured to set, within the video, windows each having a different predetermined volume, the orientation of spatial intensity gradient calculation unit is configured to calculate, for each of the windows, an orientation of spatial intensity gradient for each pixel included in the window, the spatial histogram calculation unit is configured to calculate, for each of the windows, a spatial histogram within the window, the orientation of temporal intensity gradient calculation unit is configured to calculate, for each of the windows, an orientation of temporal intensity gradient for each pixel included in the window, the temporal histogram calculation unit is configured to calculate, for each of the windows, a temporal histogram within the window, and the determination unit is configured to: sequentially select windows having in a descending order starting from a window having a largest volume from among the windows until it is determined that the moving object is included within the window; and determine whether or not the moving object is included within the selected window, based on the spatial histogram and the temporal histogram with respect to the selected window.

10. The moving object detection device according to claim 1, wherein a width of the orientation of spatial intensity gradient is constant in each bin of the spatial histogram calculated by the spatial histogram calculation unit, and a width of the orientation of temporal intensity gradient is constant in each bin of the temporal histogram calculated by the temporal histogram calculation unit.

11. A method for detecting a moving object from a video, comprising:

setting, using a window setting unit, a window having a predetermined volume in the video that is a three-dimensional video in which two-dimensional images are arranged in a temporal axis direction;

calculating, using an orientation of spatial intensity gradient calculation unit, for each pixel included in the window, an orientation of spatial intensity gradient that is an orientation of spatial gradient of intensity;

calculating, using a spatial histogram calculation unit, a spatial histogram that is a histogram of the orientation of spatial intensity gradient within the window;

calculating, using an orientation of temporal intensity gradient calculation unit, for each pixel included in the window, an orientation of temporal intensity gradient that is an orientation of temporal gradient of intensity;

calculating, using a temporal histogram calculation unit, a temporal histogram that is a histogram of the orientation of temporal intensity gradient within the window; and determining, using a determination unit, whether or not the moving object is included within the window, based on the spatial histogram calculated in the calculating of the spatial histogram and the temporal histogram calculated in the calculating of the temporal histogram.

12. A non-transitory computer-readable recording medium having a program for detecting a moving object from a video recorded thereon, the program causing a computer to execute:
   setting a window having a predetermined volume in the video that is a three-dimensional video in which two-dimensional images are arranged in a temporal axis direction;
   calculating, for each pixel included in the window, an orientation of spatial intensity gradient that is an orientation of spatial gradient of intensity;
   calculating a spatial histogram that is a histogram of the orientation of spatial intensity gradient within the window;
   calculating, for each pixel included in the window, an orientation of temporal intensity gradient that is an orientation of temporal gradient of intensity;
   calculating a temporal histogram that is a histogram of the orientation of temporal intensity gradient within the window; and
   determining whether or not the moving object is included within the window, based on the spatial histogram calculated in the calculating of the spatial histogram and the temporal histogram calculated in the calculating of the temporal histogram.

13. An integrated circuit which detects a moving object from a video, comprising:
   a window setting unit configured to set a window having a predetermined volume in the video that is a three-dimensional video in which two-dimensional images are arranged in a temporal axis direction;
   an orientation of spatial intensity gradient calculation unit configured to calculate, for each pixel included in the window, an orientation of spatial intensity gradient that is an orientation of spatial gradient of intensity;
   a spatial histogram calculation unit configured to calculate a spatial histogram that is a histogram of the orientation of spatial intensity gradient within the window;
   an orientation of temporal intensity gradient calculation unit configured to calculate, for each pixel included in the window, an orientation of temporal intensity gradient that is an orientation of temporal gradient of intensity;
   a temporal histogram calculation unit configured to calculate a temporal histogram that is a histogram of the orientation of temporal intensity gradient within the window; and
   a determination unit configured to determine whether or not the moving object is included within the window, based on the spatial histogram calculated by the spatial histogram calculation unit and the temporal histogram calculated by the temporal histogram calculation unit.

* * * * *